United States Patent
Itoh et al.

(10) Patent No.: US 7,412,114 B2
(45) Date of Patent: Aug. 12, 2008

(54) METHOD OF GENERATING AN INTERPOLATION IMAGE, AN INTERPOLATION IMAGE GENERATING APPARATUS, AND AN IMAGE DISPLAY SYSTEM USING THE SAME

(75) Inventors: Goh Itoh, Yokohama (JP); Nao Mishima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 688 days.

(21) Appl. No.: 10/806,180

(22) Filed: Mar. 23, 2004

(65) Prior Publication Data

US 2004/0240551 A1    Dec. 2, 2004

(30) Foreign Application Priority Data

Mar. 25, 2003  (JP)  ............................. 2003-083129
Nov. 5, 2003   (JO)  ............................. 2003-375831

(51) Int. Cl.
G06T 5/50  (2006.01)
(52) U.S. Cl. .................................................... 382/300
(58) Field of Classification Search ................. 382/300
See application file for complete search history.

(56) References Cited

U.S. PATENT DOCUMENTS

| 4,383,272 A | * | 5/1983 | Netravali et al. | .......... 348/416.1 |
| 4,651,207 A | * | 3/1987 | Bergmann et al. | ..... 375/240.12 |
| 4,771,331 A | * | 9/1988 | Bierling et al. | ........ 375/240.01 |
| 5,198,901 A | * | 3/1993 | Lynch | ................... 375/240.14 |
| 5,200,820 A | * | 4/1993 | Gharavi | ................. 375/240.12 |
| 5,214,751 A | * | 5/1993 | Robert | ........................ 345/606 |
| 5,394,196 A | * | 2/1995 | Robert | ........................ 348/699 |
| 5,933,547 A | * | 8/1999 | Dudon et al. | ............... 382/300 |
| 6,031,538 A | * | 2/2000 | Chupeau et al. | ............. 345/419 |
| 6,289,050 B1 | * | 9/2001 | Ohtani et al. | .......... 375/240.16 |

(Continued)

FOREIGN PATENT DOCUMENTS

JP    2000-224593    8/2000

(Continued)

OTHER PUBLICATIONS

Chan et al., Experiments on block-matching techniques for video coding, 1994, Multimedia Systems, 2:228-241.*

(Continued)

*Primary Examiner*—Vikkram Bali
*Assistant Examiner*—David P Rashid
(74) *Attorney, Agent, or Firm*—Oblon, Spivak, McClelland, Maier & Neustadt, P.C.

(57) ABSTRACT

A method of generating an interpolation image includes dividing a first image into first blocks, searching the second image for a second block having a strong correlation, deriving a first motion vector between the first and second blocks, extracting from the first block a first sub block including pixels that an absolute difference value is less than a threshold and a second sub block including pixels that it is not less than the threshold, searching a region on the second image for a third sub block having a strong correlation with respect to the second sub block, deriving a second motion vector between the second and third sub blocks, and copying the first and second sub blocks onto a third image between the first and second frames, using the first and second motion vectors.

10 Claims, 17 Drawing Sheets

U.S. PATENT DOCUMENTS 6,625,333 B1 * 9/2003 Wang et al. .................. 382/300
2004/0240551 A1 12/2004 Itoh et al.

FOREIGN PATENT DOCUMENTS

JP 2002-27414 1/2002

OTHER PUBLICATIONS

U.S. Appl. No. 11/032,167, filed Jan. 11, 2005, Baba et al.
U.S. Appl. No. 10/383,631, filed Mar. 10, 2003, Itoh et al.
U.S. Appl. No. 10/657,174, filed Sep. 9, 2003, Mishima et al.
U.S. Appl. No. 10/658,539, filed Sep. 10, 2003, Itoh et al.
U.S. Appl. No. 10/806,180, filed Mar. 23, 2004, Itoh et al.
U.S. Appl. No. 10/808,319, filed Mar. 25, 2004, Mishima et al.
U.S. Appl. No. 10/855,617, filed May 28, 2004, Mishima et al.

\* cited by examiner

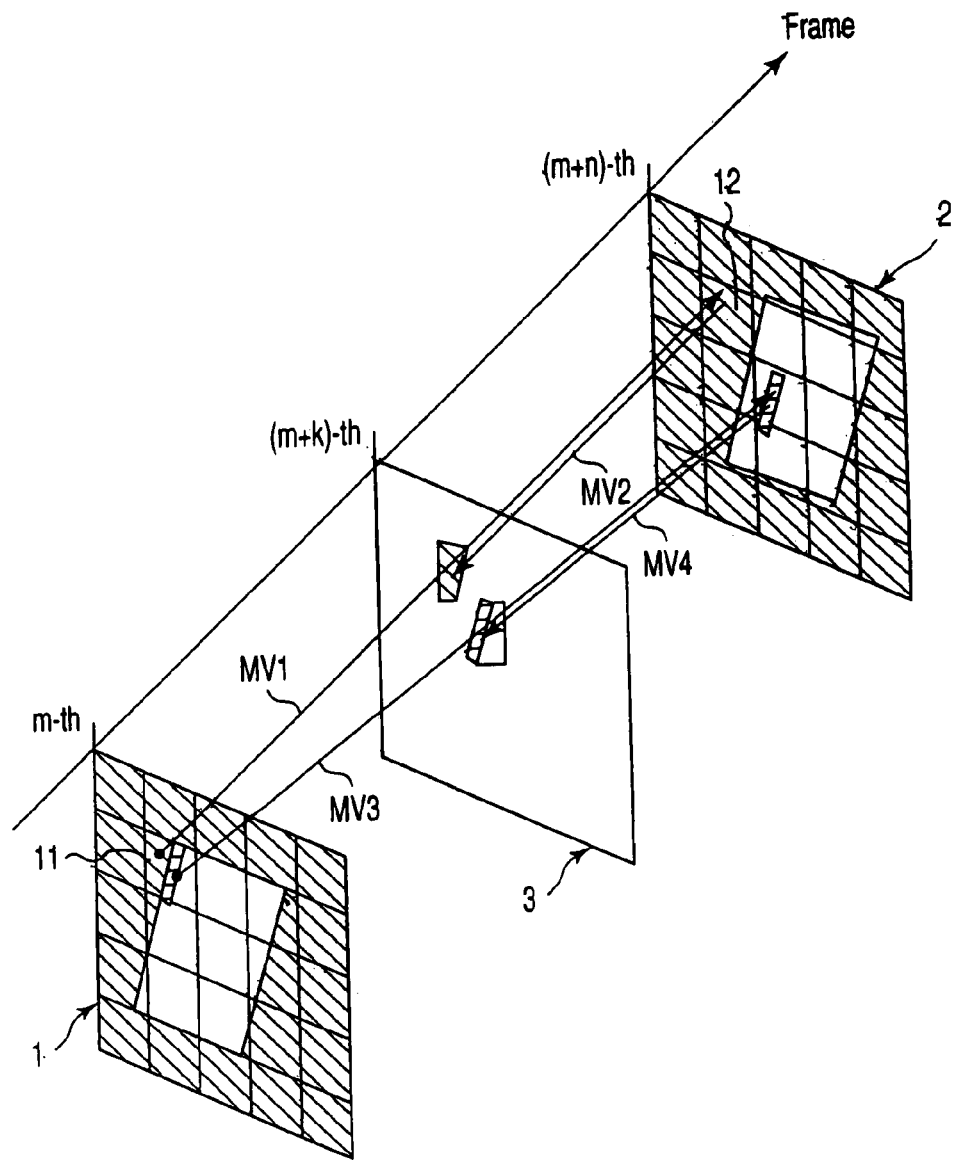
F I G. 1

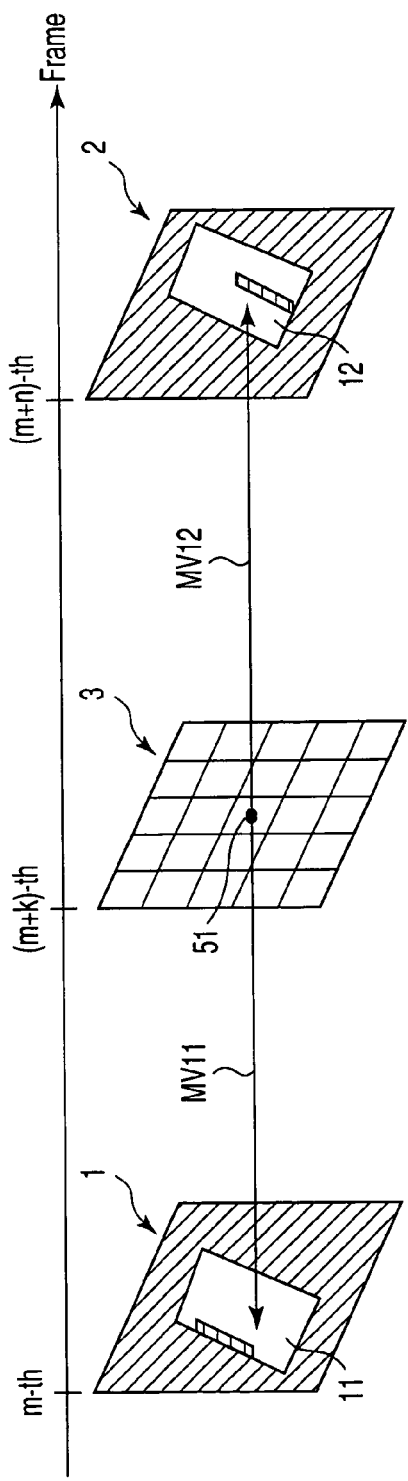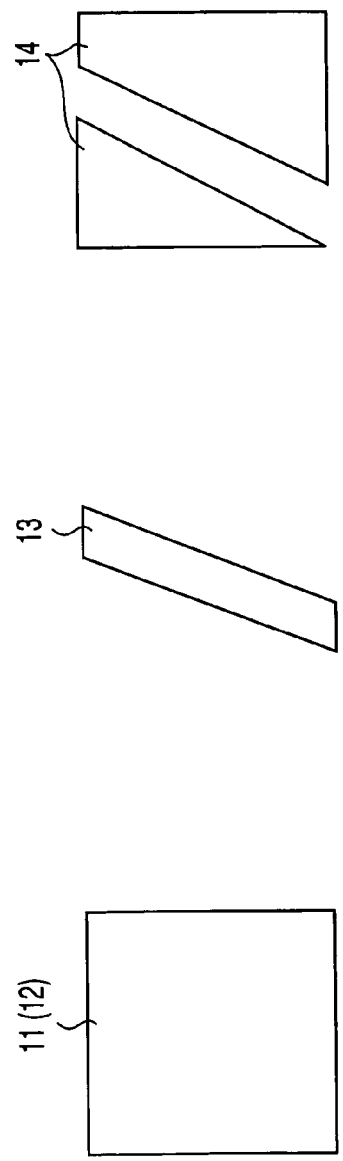
FIG. 12A
FIG. 12B
FIG. 12C
FIG. 12D

METHOD OF GENERATING AN INTERPOLATION IMAGE, AN INTERPOLATION IMAGE GENERATING APPARATUS, AND AN IMAGE DISPLAY SYSTEM USING THE SAME

CROSS-REFERENCE TO RELATED APPLICATIONS

This application is based upon and claims the benefit of priority from prior Japanese Patent Applications No. 2003-083129, filed Mar. 25, 2003; and No. 2003-375831, filed Nov. 5, 2003, the entire contents of both of which are incorporated herein by reference.

BACKGROUND OF THE INVENTION

1. Field of the Invention

The present invention relates to a method of generating an interpolation image to improve blurring due to a hold type display device or unnatural movement in a moving image whose frames are few in number, an interpolation image generating apparatus, and an image display system using the same.

2. Description of the Related Art

Generally, there are two kinds of image display devices: an impulse type display device that continues emitting light for only an afterglow time of a fluorescent substance after writing of image (for example, CRT and field emission type display device (FED)), and a hold type display device which continues holding display of a previous frame till an image is newly written (for example, Liquid Crystal Display (LCD), electroluminescence display (ELD), etc.)

A problem of the hold type visual display unit is a blurring phenomenon to produce in displaying a moving image. The blurring phenomenon occurs by the reason that when the eyes of a viewer followed movement of the moving object existing in a moving image consisting of a plurality of frames, the images of the frames are projected on the retina with being superposed. Though the image of a previous frame continues being displayed until the display image is replaced from the previous frame by a next frame, the viewer predicts the image of the next frame and observes the image while moving the eyes on the previous frame in a migration direction of the moving object. In other words, since the eyes have continuous tracking exercise and do sampling with an interval shorter than a frame interval, an image formed by bridging between two adjacent frames is observed as blurring.

This problem can be solved by shortening an interval between display frames. As a result, an unnatural movement of a moving image whose frames are few in number can be improved. It is considered as a concrete technique to form an interpolation image using motion compensation used in MPEG2 (Motion Picture Experts Group phase 2) to interpolate between adjacent frames with the interpolation image. In motion compensation, a motion vector detected by block matching is used. However, since an image is generated in units of a block in MPEG2, when a plurality of objects whose movements differ from one another is included in a block, a part with correlation and a part without correlation appear. The block distortion occurs by the part without correlation.

Japanese Patent Publication (KOKAI) No. 2000-2224593 discloses a frame interpolation method for solving this problem. According to the Publication, in determining a pixel value of a to-be-interpolated block in an interpolation frame, the motion compensated interframe absolute difference value between two frames of a to-be-decoded small block is compared with a threshold every opposite pixels, the block is divided into a first pixel region having an absolute difference value less than a threshold and a second pixel region having an absolute difference value higher than the threshold.

About the first pixel region, an average of the pixel value of the first pixel region and the pixel value of the corresponding pixel in the reference block indicated by a motion vector between two frames is obtained. The average is copied onto the interpolation frame. On the other hand, about the second pixel region, hidden surface relation in a to-be-decoded frame is determined. A motion vector search direction between two frames is again set based on the determination result, and a motion vector is detected. The pixel on the researched reference frame that is indicated by a scaled motion vector is copied onto an interpolation frame. In this way, by means of doing interpolation in units of a pixel region obtained by dividing a to-be-decoded block in two according to the motion compensated interframe absolute difference value between two frames, a block distortion, namely an interpolation error appearing when a plurality of objects whose movements differ from one another are included in the block is reduced.

In the Publication, a search method in the second pixel region performs reshuffling of a frame direction, but an extraction method in a frame to be detected does not touch additional information. It is not appropriated to employ the pixel used in the first pixel region as a pixel of the second pixel region to reflect movement of an actual object. As thus described, to search for the pixels of the second region without doing constrain for the pixels of the first pixel region extracted after region division may cause picture degradation (deterioration for a noise) due to interpolation error.

It is an object of the present invention to provide an interpolation image generating method for doing an intra-frame interpolation without an interpolation error, and an image display system using the same.

BRIEF SUMMARY OF THE INVENTION

According to an aspect of the present invention, there is provided a method of generating an interpolation image comprising: dividing a first image into a plurality of first blocks; searching the second frame for a second block having a strong correlation with respect to one of the first blocks every first block; deriving a first motion vector between the first block and the second block; extracting from the first block a first sub block including pixels that an absolute difference value is less than a threshold and a second sub block including pixels that the absolute difference value is not less than the threshold, the absolute difference value being an absolute difference value between opposite pixels of the first block and the second block; searching a region on the second frame for a third sub block having a strong correlation with respect to the second sub block, the region being a region that the absolute difference value is not less than the threshold; deriving a second motion vector between the second sub block and the third sub block; and copying the first sub block and the second sub block onto a third frame between the first frame and the second frame, using the first motion vector and the second motion vector.

According to another aspect of the present invention, there is provided an interpolation image generating apparatus comprising: an input unit configured to input a first frame and a second frame; a division unit configured to divide the first frame into a plurality of first blocks; a first motion vector detection unit configured to search the second frame, for a second block with a strong correlation with respect to one of the first blocks every first block to obtain a first motion vector; an extraction unit configured to extract from the first block a first sub block and a second sub block, the first sub block including pixels that an absolute difference value between opposite pixels of the first block and the second block is less than a threshold, and the second sub block including pixels that the absolute difference value is not less than the threshold; a second motion vector detection unit configured to search a region on the second frame that the absolute difference value is not less than the threshold for a third sub block with a strong correlation with respect to the second sub block to obtain a second motion vector; and an interpolation image generation unit configured to copy the first sub block and the third sub block onto a third frame between the first frame and the second frame, using the first motion vector and the second motion vector.

BRIEF DESCRIPTION OF THE SEVERAL VIEWS OF THE DRAWING

FIG. 1 is a diagram showing an allocation of an interpolation frame in an interpolation image generating method according to a first embodiment of the present invention;

FIGS. 12A to 12D are diagrams showing a search of to-be-interpolated block and each extracted block in the third embodiment according to the present invention;

DETAILED DESCRIPTION OF THE INVENTION

There will now be described embodiments of the present invention in conjunction with drawings. Each embodiment to explain in the following is realized by a program to work on a computer. The present invention may come out with monolithic IC.

First Embodiment

As shown in FIG. 1, an interpolative image is generated in a time position of a (m+k)-th frame 3 ((k is a real number between 0 and n)) between an m-th frame 1 (m is an integer) and a (m+n)-th frame 2 (n is an integer other than 0) of an original image comprising of a plurality of pixels. The first embodiment of the present invention uses a procedure shown in flow charts of FIGS. 2 and 3. M=1 and n=1, namely the m-th frame and the (m+n)-th frame are described as two consecutive frames of a video. k assumes 0.5, for example.

Figure 4:
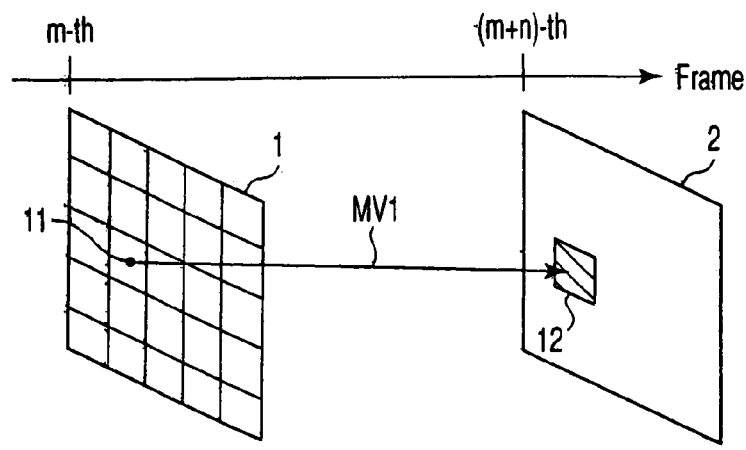
FIG. 4 is a diagram of explaining the first block search in the embodiment.
Figures 5A, 5B:
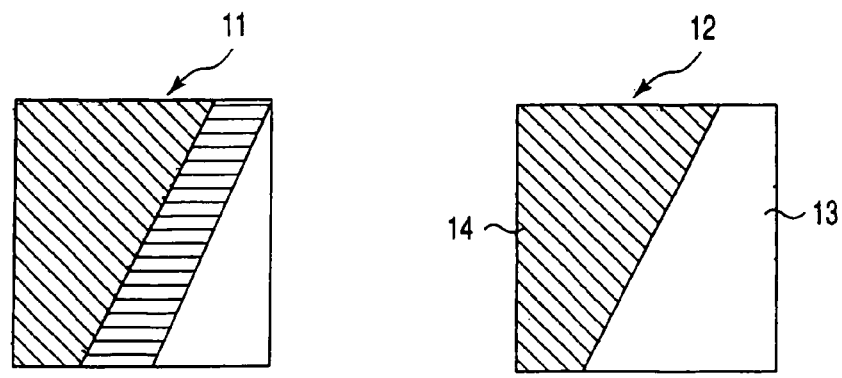
FIGS. 5A to 5C are diagrams showing extracted first and second blocks and extracted first and second regions in the embodiment.

At first, as shown in FIG. 4, image data of the m-th frame 1 is divided into a plurality of first blocks 11 to extract sequentially the first blocks 11 (step S100). A second block of the same size and shape as each of the first blocks 11 is extracted from image data of the (m−k)-th frame 2 (step S101). FIGS. 5A and 5B show the extracted first and second blocks 11 and 12, respectively.

In the present embodiment, a pair of first and second blocks 11 and 12 are selected by the next method.

At first the first absolute difference value between the opposite pixels between the first and second blocks is compared with a first threshold every pixel. The pixels each indicating the first absolute difference value not more than the first threshold are counted to obtain a pixel number p (p is an integer more than 0). A pair of blocks that the pixel number p is maximum is selected. Without being limited to the method, a pair of blocks that the sum of the first absolute difference values becomes minimum may be selected.

The first absolute difference value between the opposite pixels of the first and second blocks 11 and 12 is derived (step S102). The first threshold is compared with the first absolute difference value (step S103). In the present embodiment, since the first absolute difference value is computed every pixel in extracting the second block, the calculation result is used in step S102.

According to comparison result of step S103, from the second block 12 are extracted the first sub block 14 including the pixels that the first absolute difference value is less than the first threshold, and the second sub block 13 including the pixels that the first absolute difference value is more than the first threshold (step S104, S105). That is to say, the second sub block 13 of the second block 12 is a region having a weak correlation with respect to the first block 11, and the first sub block 14 is a region having a strong correlation with respect to the first block 11. The vector connecting the first sub block 14 and the pixel block in the first block 11 that corresponds to the first sub block 14 is assumed as a first motion vector D with respect to the first sub block 14.

Figure 5C:
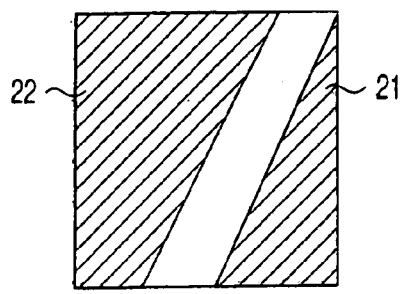

When a process from steps S102 to S105 is done with respect to all combinations of the first block 11 and the second block 12. About the m-th frame 1 and (m+n)-th frame 2, the pixel that the first absolute difference value is not less than the first threshold and the pixel that the first absolute difference value is less than the first threshold can be identified from each other. Using this, the m-th frame 1 and (m+n)-th frame 2 are divided into the first region 21 including pixels corresponding to the second sub block 13 (the pixel that the first absolute difference value is not less than the first threshold) and the second region 22 including pixels corresponding to the first sub block 14 (the pixel that the first absolute difference value is less than the first threshold) as shown in FIG. 5C (step S106, S107).

Figure 6:
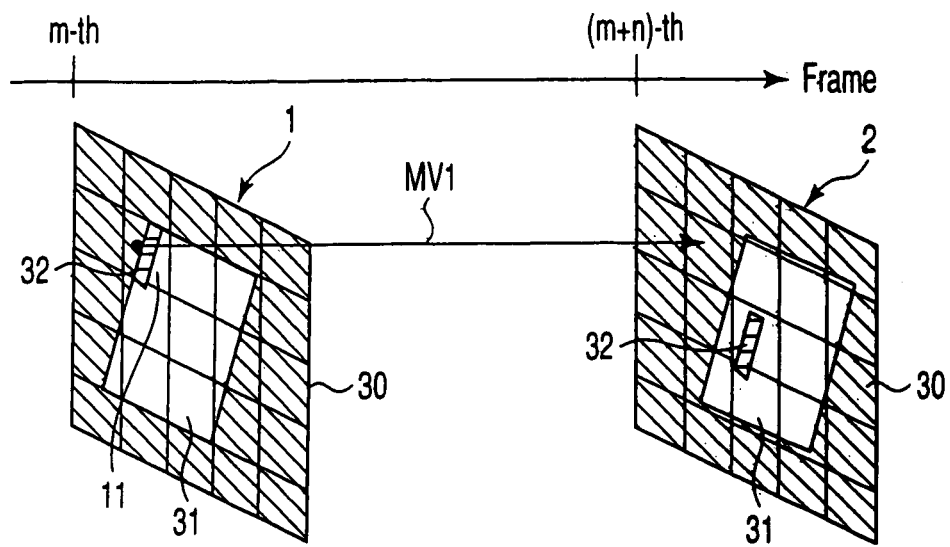
FIG. 6 is a diagram showing an example of image and a first motion vector in the embodiment.
Figure 7:
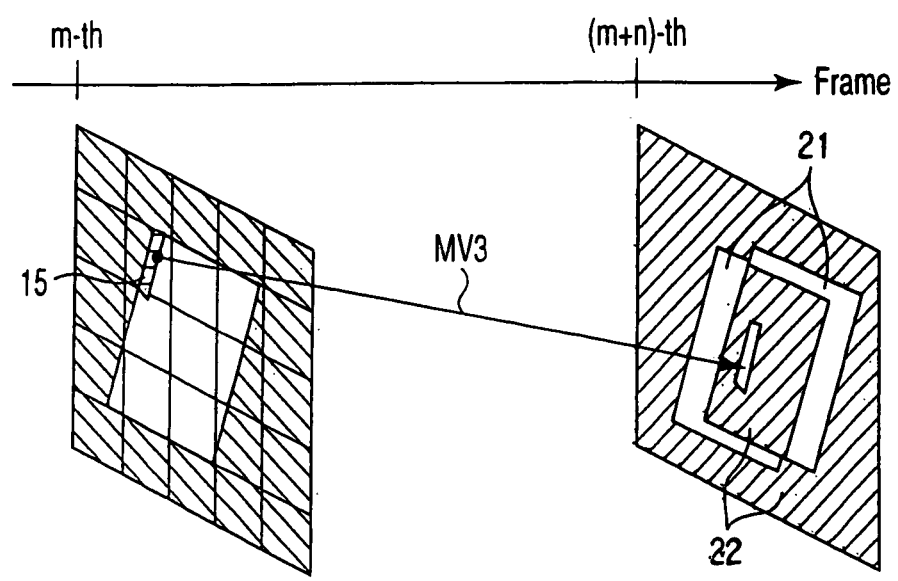
FIG. 7 is a diagram showing a second motion vector in the embodiment.

When there is an object 31 of a parallelogram shown in an outline on a colored background moving in a cross direction on the background 30 as shown in slanted line in FIG. 6, for example, and an object 32 of a parallelogram as shown in lateral stripes that moves in a right diagonal direction, a pair of first and second blocks 11 and 12 that indicate the maximum correlation can be obtained when the first and second blocks 11 and 12 together exist on the background 30. In this case, the first region 21 is a varied region (an outline on a colored background part in the (m+n)-th frame 2 in FIG. 6) and the rest (daubed part of the (m+n)-th frame 2 in FIG. 6) becomes the second region 22 as shown in FIG. 7.

Figure 8A:
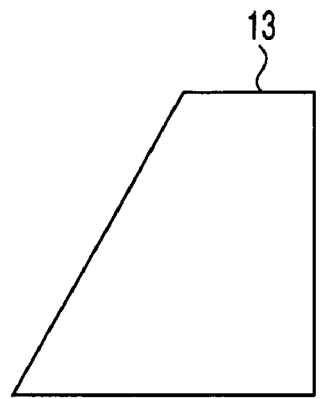
FIGS. 8A to 8F are diagrams showing image data of each block and image data that is a candidate of the fourth sub block in the embodiment.

The second sub block 13 extracted from the second block 12 in step S104 becomes a trapezoid as shown in FIG. 8A. Because the pixels included in the second sub block 13 indicate the first absolute difference value more than the first threshold as described above, they include image data representing a weak correlation with respect to the first block 11. Therefore, it is necessary to extract from the (m+n)-th frame, image data having a strong correlation with respect to the first block 11, again.

Figure 8B:
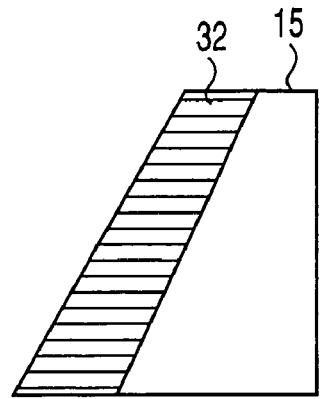

For this reason, after step S107, the third sub block 15 of the same size and shape as the second sub block 13 are extracted from the m-th frame 1 as shown in FIG. 8B (step S108). The fourth sub block 16 of the same size and shape as the third sub block 15 is extracted from the (m+n)-th frame 2 (step S109).

Figure 8C:
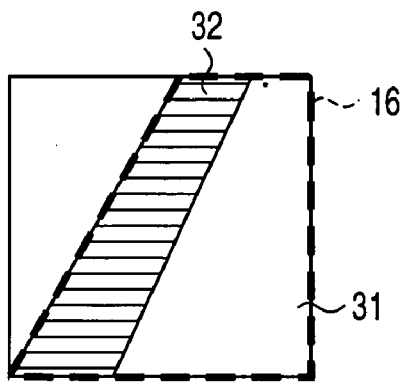
Figure 8D:
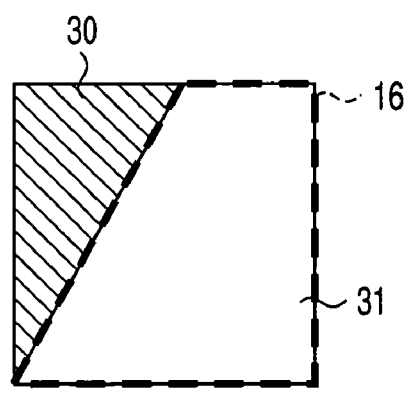

The second absolute difference value is obtained every opposite pixels of the third and fourth sub blocks 15 and 16 (step S110). As shown in FIGS. 8C, 8D, the image data of a region of the same size and shape as the third sub block 15 (the region surrounded with a dotted line) can be extracted from the (m+n)-th frame 2 as a candidate of sub block 16. FIG. 8C is really image data of the part that an object 32 of a parallelogram as shown in lateral stripes moved. FIG. 8D is image data of a boundary between an object 31 shown in slanted lines and a background 30 shown in outline. Because the size of the object 31 is bigger than that of the object 32, the image data of the object 31 is extracted as a candidate of the fourth sub block 16.

Figure 8E:
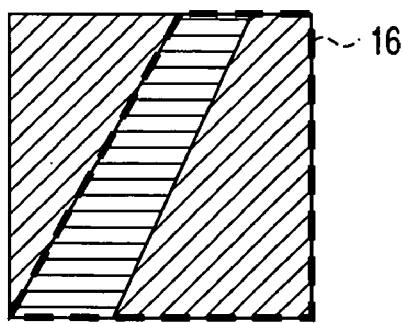
Figure 8F:
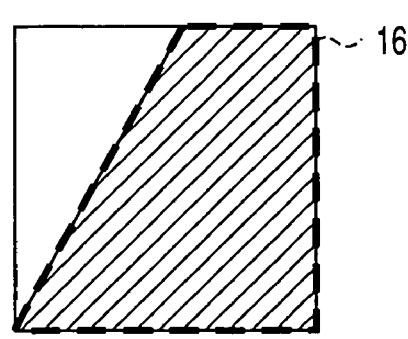

It is determined every pixel whether or not the fourth sub block 16 belongs to the first region 21 or the second region 22 (step S111). As shown in, for example, FIGS. 8E and 8F, the region division state of the part (in a region surrounded with a dotted line) including the image data of the same shape is examined. FIG. 8F shows that all the region is pixels already extracted as the sub block 13. The second absolute difference value of the pixels that to belong to the first region 21 is compared with the second threshold, and the fifth sub block whose second absolute difference value is less than the second threshold is extracted from the fourth sub block (steps S112, S114).

The second absolute difference value of the pixel belonging to the second region 22 is compared with the third threshold, and the sixth sub block that the second absolute difference value is less than the third threshold is extracted from the fourth sub block (steps S113, S115).

The pixel belonging to neither the fifth sub block nor the sixth sub block may exist in the fourth sub block. Such pixel becomes a factor to produce a pixel containing no image data in an interpolation frame. Therefore, postprocessing is done to extract image data of such pixel (step S116). In the present embodiment, the image data of a to-be-postprocessed pixel is a weighted average value of image data of a plurality of pixels approximating to the to-be-postprocessed pixel.

Figure 9:
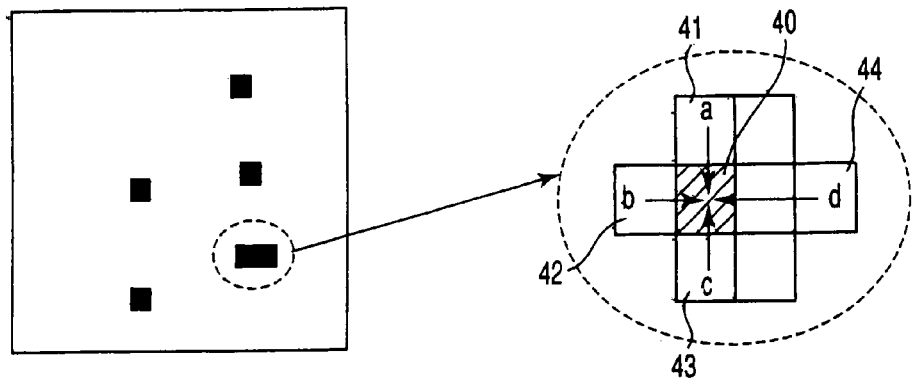
FIG. 9 is a diagram showing a method of obtaining image data from adjacent pixels with respect to the pixel that was not able to extract image data.

The weighting factor used in deriving this weighted mean value can be defined by a reciprocal number of a distance between a to-be-postprocessed pixel and a pixel adjacent thereto. When image data of the to-be-postprocessed pixels in the slanted part as shown in FIG. 9 is derived. The image data a, b and c of top, down and left pixels 41, 42 and 43 are weighted by being multiplied by a weighting factor 2. The image data of the second pixel 44 from the right (because of the right pixel having no image data) is weighted by being multiplied by a weighting factor 1. The weighted mean value is obtained as $[2(a+b+c)+d]/7$ by dividing the sum $2(a+b+c)+d$ of four weighted image data by 7 ($=2+2+2+1$).

An interpolation image is formed on the (m+k)-th frame 3 by copying, onto the (m+k)-th frame 3 according to each time position, image data of each pixel in the first sub block extracted in step S105, the fifth sub block extracted in step S114 and the sixth sub block extracted in step S115, and image data of each pixel obtained by postprocessing of step S116 (step S117).

The copying of image data of the first sub block, the fifth sub block and the sixth sub block onto the (m+k)-th frame 3 is done according to a motion vector between the m-th frame 1 and the (m+n)-th frame 2 in the block which the respective image data belongs to as shown in FIG. 1.

The copy process is done as follows. At first, the first motion vector MV1 from the first block 11 to the second block 12 is obtained. This first motion vector MV1 is a motion vector from a sub block corresponding to the first sub block 14 of the first block 11 to the first sub block 14. The second motion vector MV2 is derived by multiplying the first motion vector MV1 by $-(n-k)/k$. In other words, the second motion vector MV2 is derived by scaling the first motion vector MV1 to a motion vector from the (m+n)-th frame 2 to the (m+k)-th frame 3.

Similarly, the third motion vector MV3 from the fourth sub block to the fifth sub block is derived, and scaled to obtain the fourth motion vector MV4.

The first sub block is copied onto the (m+k)-th frame 3 by means of the second motion vector MV2. Further, the fifth and sixth sub blocks are copied onto the (m+k)-th frame 3 by means of the fourth motion vector MV4. When, for example, n=1, k=0.5, the (m+k)-th frame 3 is 1.5-th frame. An interpolation image is generated by copying the first sub block onto the position shown by the second motion vector MV2 which is ½ of the first motion vector MV1, and then copying the fifth and sixth sub blocks onto the position shown by the fourth motion vector MV4 which is ½ of the third motion vector MV3.

In the case that a part occurs on which a plurality of blocks are redundantly copied on the to-be-interpolated block on the (m−k)-th frame 3, the image data of the part is derived as an average of image data of pixels of a plurality of blocks. On the other hand, concerning the part on the (m+k)-th frame 3 on which image data is not copied at all, image data is computed by a method similar to a weighted average of adjacent pixels as described above.

Generation of interpolation image on the (m+k)-th frame 3 completes by doing a process from steps S100 to S117 for all the first blocks 11 obtained by dividing the m-th frame 1.

In the present embodiment described above, the pixels of the first, fifth and sixth sub blocks are used as interpolation image data on the (m+k)-th frame. According to the present embodiment, setting the third threshold to less than the second threshold permits reducing a possibility that the pixels extracted as the first sub block in the (m+n)-th frame is extracted as the sixth sub block again. In other words, it is reduced that the pixel extracted as the first sub block is repeatedly used as interpolation image data on the (m+k)-th frame 3, resulting in reducing an interpolation error.

In this case, some of pixels extracted as the first sub block are extracted as the sixth sub block. However, if the third threshold is made smaller than the 1st threshold, the absolute difference value of each pixel included in the second region between the third and fourth sub blocks is smaller than the pixel extracted as the first sub block. In other words, the pixel that the correlation between the third and fourth sub blocks is strong is extracted as the sixth sub block and copied onto the (m+k)-th frame 3, resulting in that it is possible to make an interpolation image of a higher accuracy.

As described above, an interpolation image of a small interpolation error can be formed according to the present embodiment. Therefore, it becomes possible to display an image without a block distortion and a noise feeling. Particularly in a moving image, display of a realistic image can be realized. It can be anticipated to improve a blurring phenomenon of image in a hold type display device, for example.

Second Embodiment

An interpolation image generating procedure related to the second embodiment of the present invention is described in conjunction with FIGS. 10 and 11 hereinafter. The present embodiment corresponds to the configuration assumed to set the third threshold in the first embodiment at 0.

Figure 2:
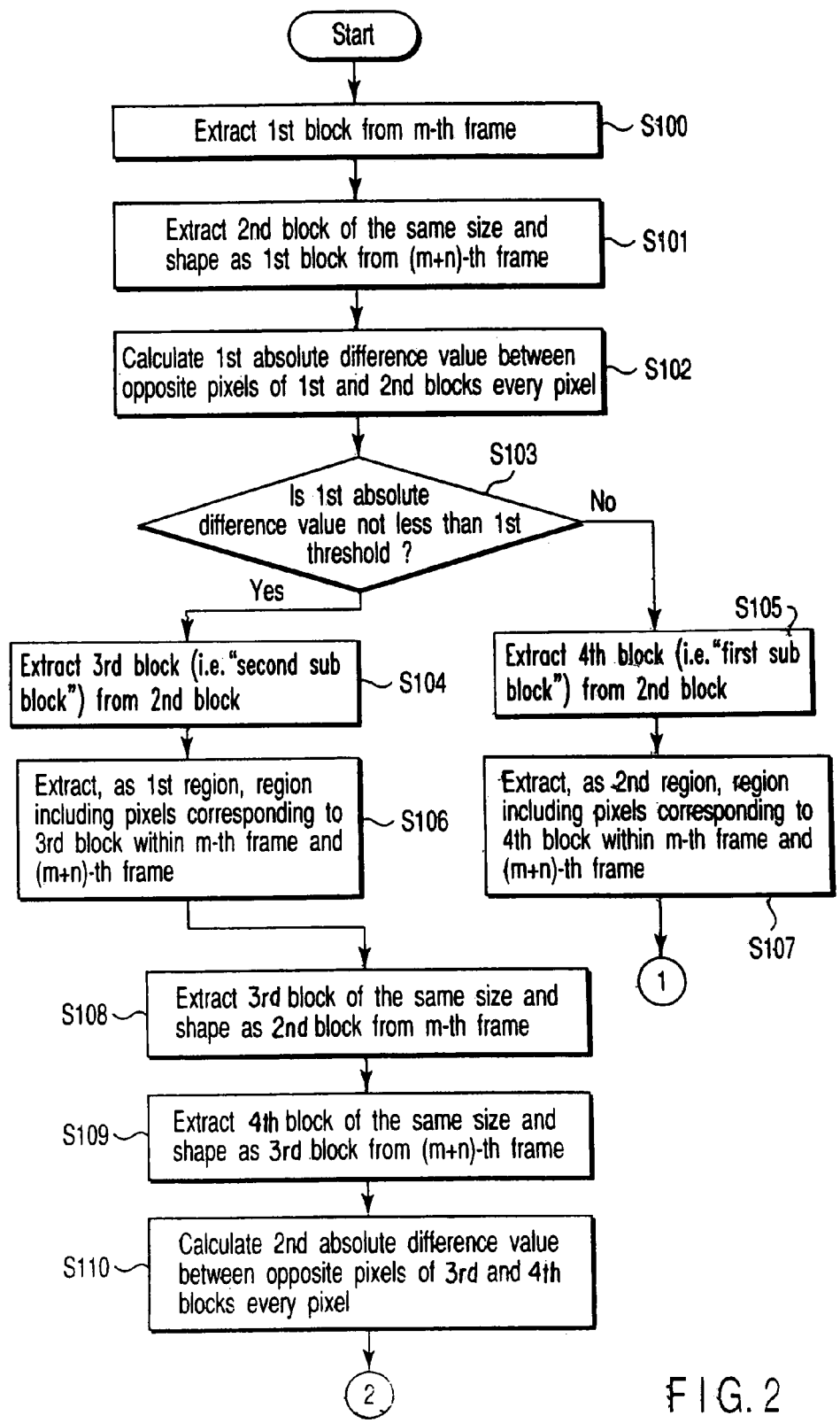
FIG. 2 is a flow chart showing an interpolation image generating procedure related to the embodiment.
Figure 3:
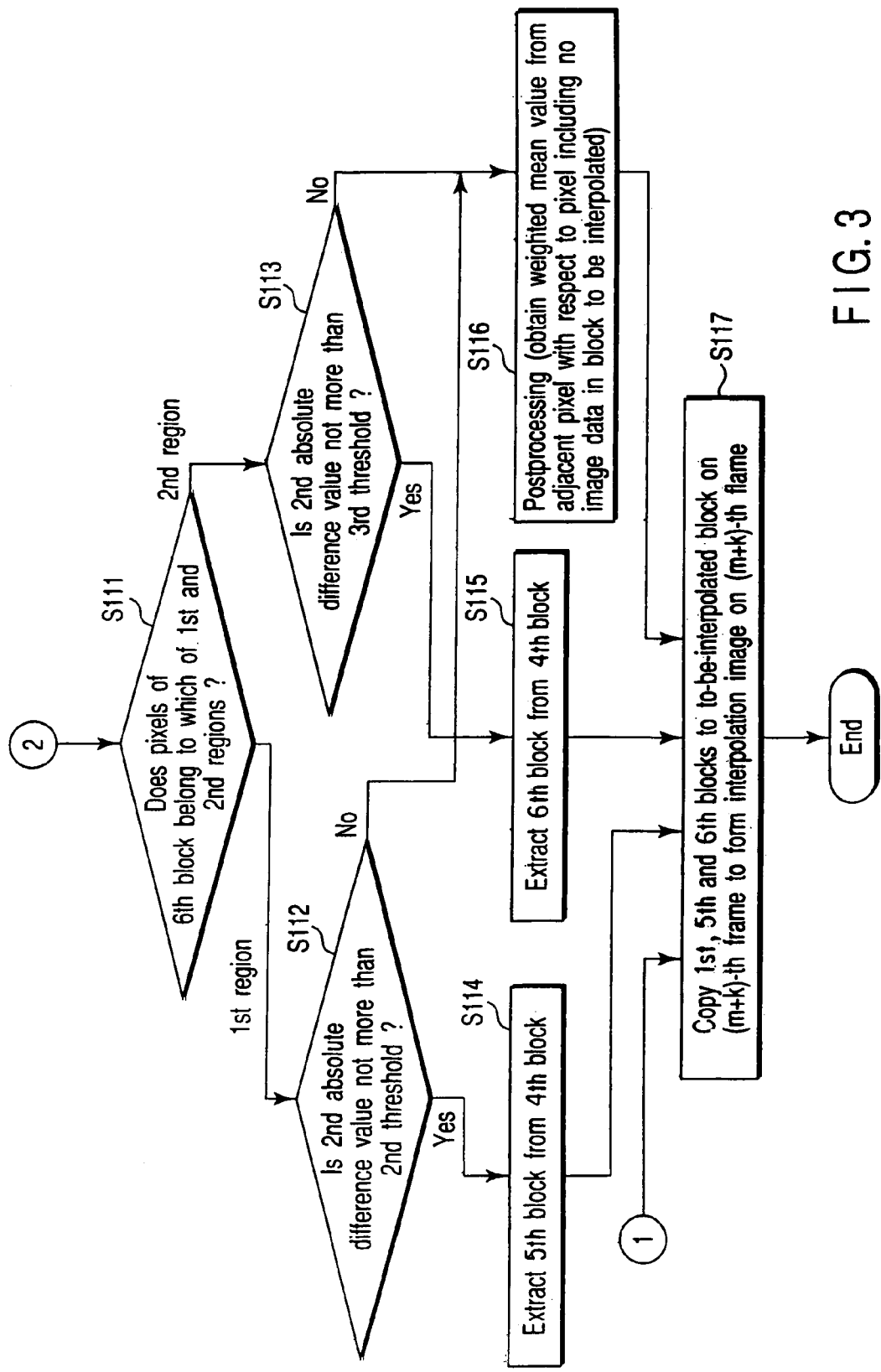
FIG. 3 is a flow chart showing an interpolation image generating procedure related to the embodiment.
Figure 11:
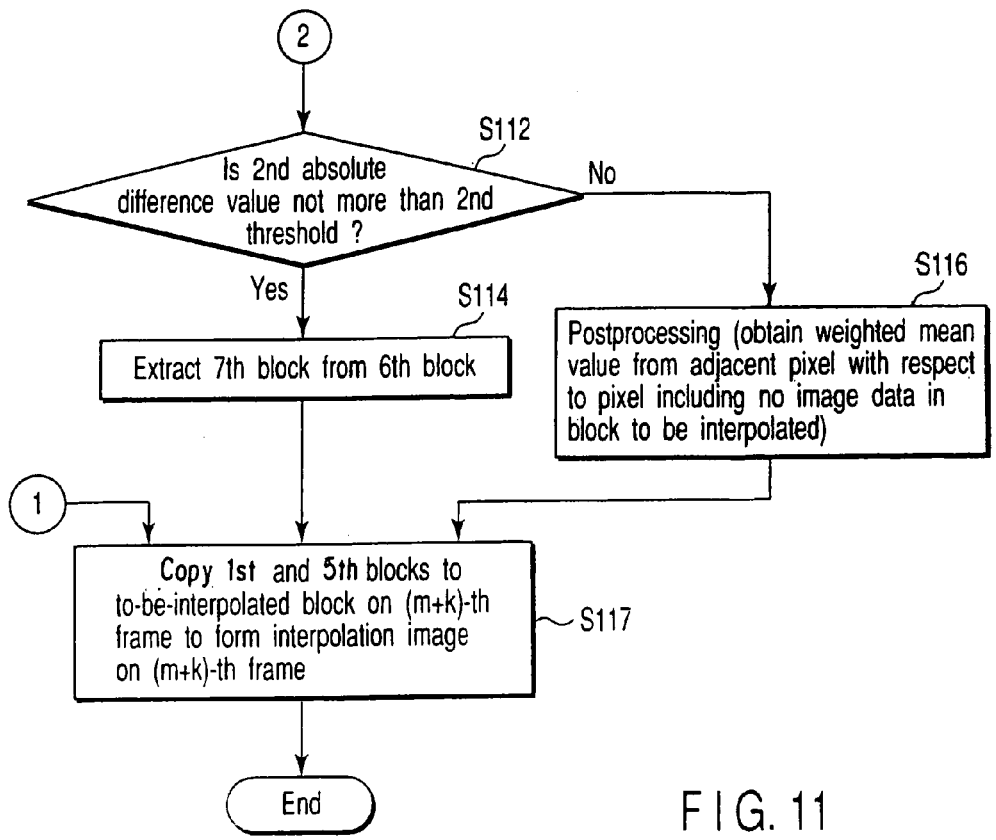
FIG. 11 is a flow chart showing an interpolation image generating procedure related to the embodiment.
Figure 10:
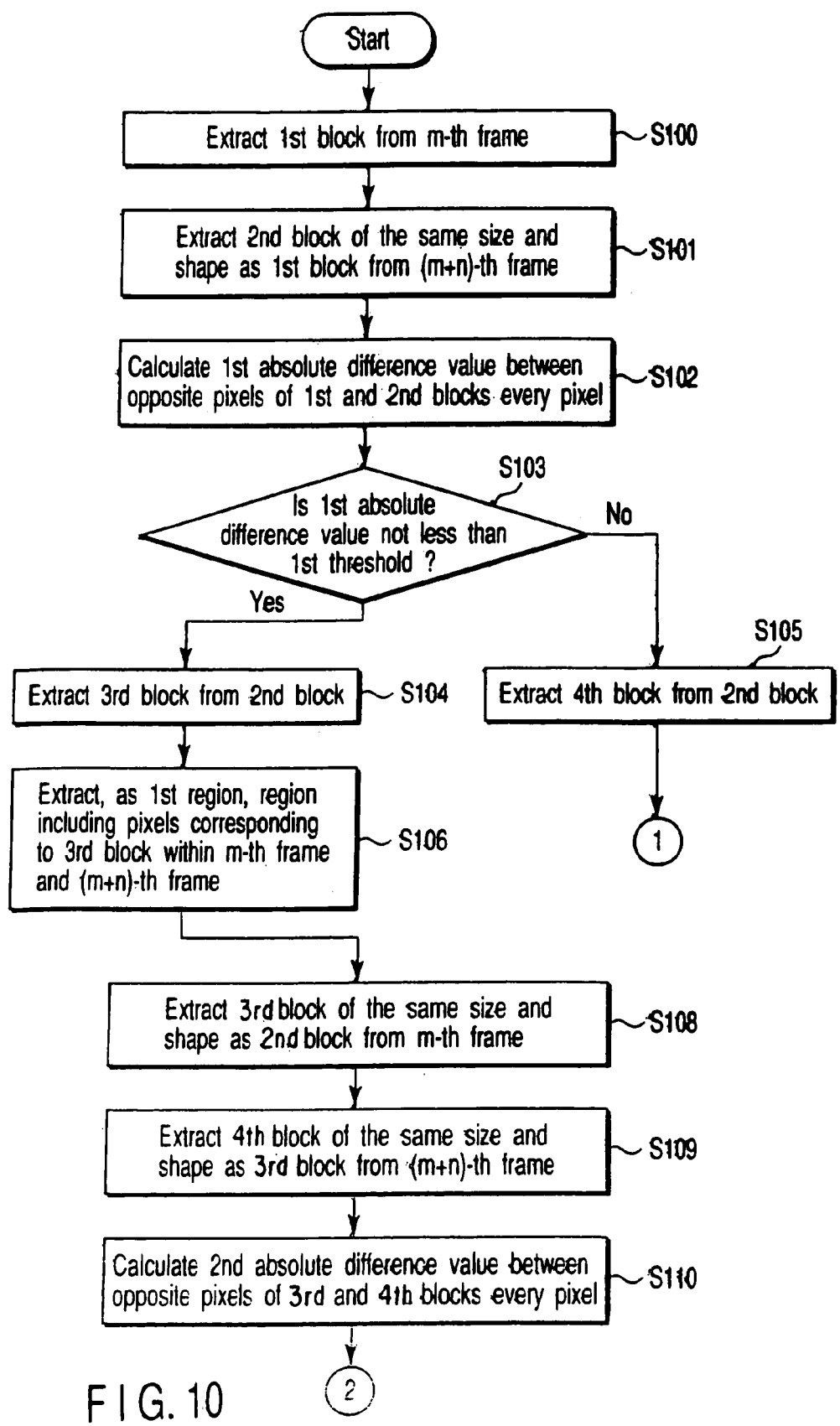
FIG. 10 is a flow chart showing an interpolation image generating procedure related to the second embodiment of the present invention.

FIGS. 10 and 11 are described referring to the same code for the same parts in FIGS. 2 and 3. In the present embodiment, step S107 in FIG. 2, and steps S111, S113 and S115 in FIG. 3 are omitted. When step S110 of FIG. 10 is finished, the process jumps to step S112 of FIG. 11. Therefore, the sixth sub block explained in the first embodiment is not extracted.

Therefore, in step S117, an interpolation image for the (m+k)-th frame 3 is formed using image data of the first and fifth sub blocks.

According to the present embodiment, the pixels of the first and fifth sub blocks are used as interpolation image data for the (m+k)-th frame by setting the third threshold in the first embodiment at 0. In other words, since the pixel extracted as the first sub block 14 is not redundantly used, an interpolation error due to repetition use of the same block can be avoided surely.

Third Embodiment

An interpolation image generating method related to the third embodiment of the present invention is described hereinafter. The present embodiment differs from the first embodiment with respect to assuming an to-be-interpolated block of an interpolation frame as shown in FIGS. 12A to 13B, and searching the m-th frame 1 and (m+n)-th frame 2 with a point symmetry around the to-be-interpolated block for the purpose of avoiding overlap of image data and clearance between images in copying image data onto the (m+k)-th frame 3. The present embodiment uses a procedure similar to the first embodiment other than the above process.

A procedure for generating an interpolation image in the present embodiment is described in conjunction with FIGS. 12A to 12D, 13A, 13B, 14 and 16 hereinafter.

At first, the (m+k)-th frame 3, for example, 1.5-th frame (m=1, k=0.5) is divided into a plurality of to-be-interpolated blocks 51 (step S200). Subsequently, the first block 11 of the same size and shape as the to-be-interpolated blocks 51 is extracted from the m-th frame 1, for example, the first frame (step S201).

As shown in FIG. 12A, a vector connecting the to-be-interpolated block 51 and the first block 11 is calculated as a first motion vector MV11 (step S202). Further, a second motion vector MV12 is calculated by multiplying the first motion vector MV11 by $-(n-k)/k$ (step S203). If $n=1$ and $k=0.5$, $-(n-k)/k=-1$ and the second motion vector MV12 is a motion vector that is the same as the first motion vector MV11 in size and reverse in direction.

The second block corresponding to a locomotive point of a to-be-interpolated block 51 is extracted from the (m+n)-th frame 2, for example, the second frame (m=1, n=1) according to the second motion vector MV12 (step S204); In the process from steps S201 to S204 there are a number of candidates on a block pair of first and second blocks 11 and 12. A block pair of first and second blocks 11 and 12 are selected from the candidates using the same method as the first embodiment. The shapes of first and second blocks 11 and 12 are rectangular as shown in FIG. 12B, for example.

The first absolute difference value between opposite pixels of the first and second blocks 11 and 12 (step S205), and the first absolute difference value is compared with the first threshold (step S206).

The second sub block whose first absolute difference value becomes larger than the first threshold is extracted from the second block 12 according to comparison result of step S206 (step S207). Further the first sub block that the first absolute difference value becomes less than 1st threshold is extracted from at least the second block 12 (step S208). The second and third sub blocks 13 and 14 extracted in this way are shown by FIGS. 12C and 12D.

In step S208 of the present embodiment, the regions that the first absolute difference value is less than the first threshold are extracted from the first and second blocks, respectively. An average of the regions assumes the first block. The first sub block that the first absolute difference value is less than the first threshold may be extracted from only the second block.

Figure 13A:
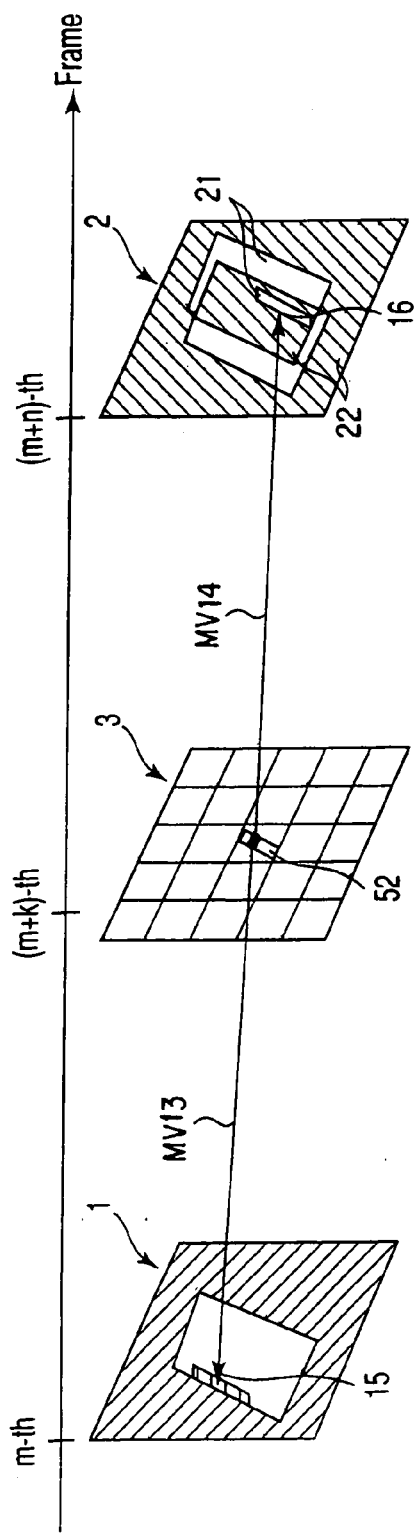
FIGS. 13A and 13B are diagrams showing a search of to-be-interpolated block and each extracted block in the embodiment.

As shown in FIG. 13A, the m-th frame 1 and (m+n)-th frame 2 are divided into the first region 21 including pixels corresponding to the second sub block 13 (pixels that the first absolute difference value is not less than the first threshold) and the second region 22 including pixels corresponding to the first sub block 14 (pixels that the first absolute difference value is less than the first threshold) (steps S209, S210).

A to-be-interpolated sub block 52 of the same size and shape as the second sub block 13 is provided on the to-be-interpolated block (step S211).

The third sub block 15 of the same size and shape as the to-be-interpolated sub block 52 is extracted from the m-th frame 1 (step S212).

The third motion vector MV3 from the to-be-interpolated sub block 52 to the third sub block 15 is calculated (step S213). Further, the fourth motion vector MV14 is calculated by multiplying the third motion vector MV13 by $-(n-k)/k$ (step S214). If $n=1$ and $k=0.5$, $-(n-k)/k=-1$ and the fourth motion vector MV14 is a motion vector that is the same as the first motion vector MV13 in size and reverse in direction.

Figure 13B:
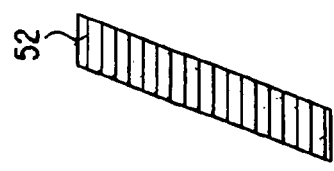
Figure 14:
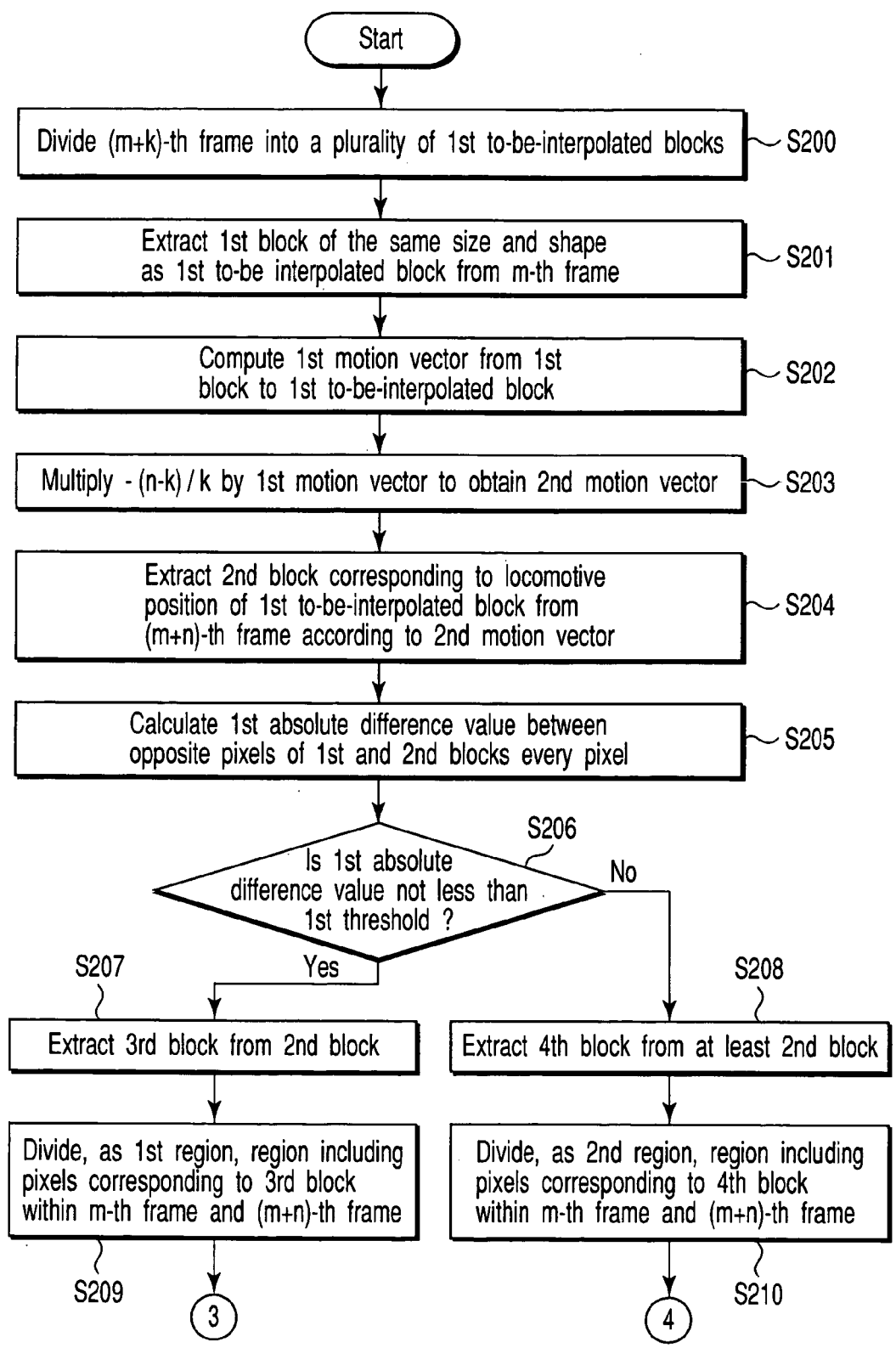
FIG. 14 is a flow chart showing an interpolation image generating procedure related to the embodiment.
Figure 15:
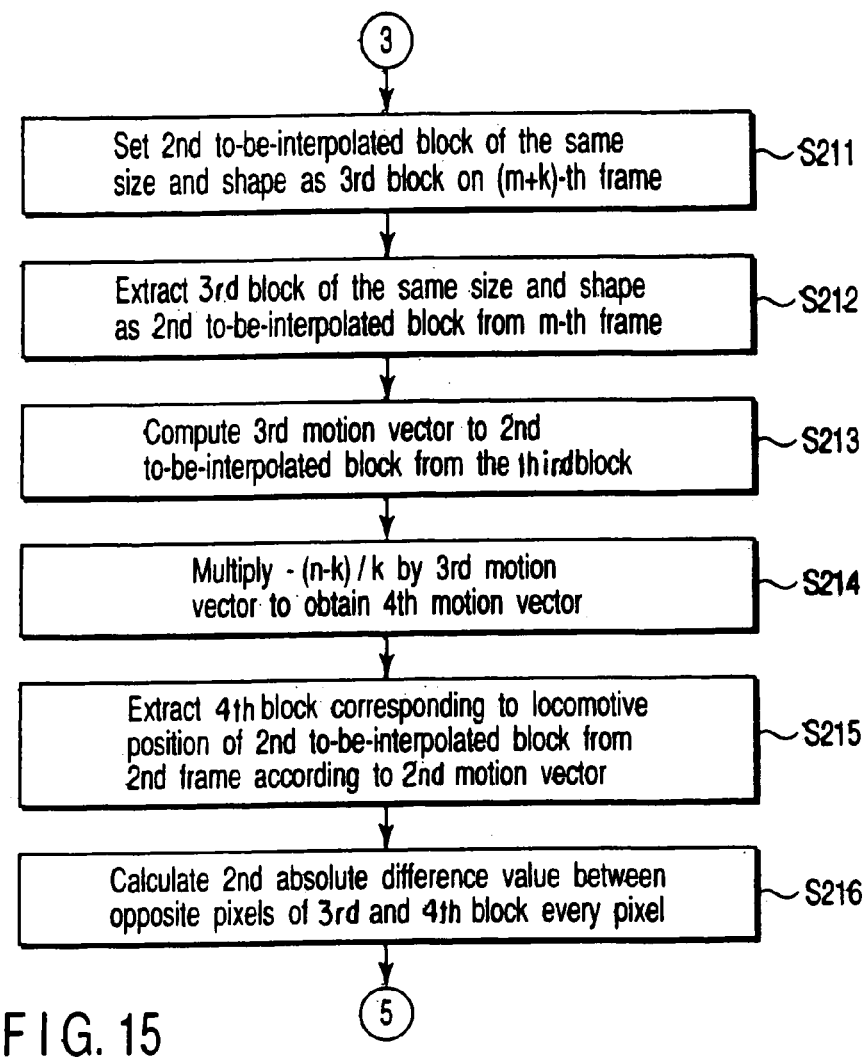
FIG. 15 is a flow chart showing an interpolation image generating procedure related to the embodiment.

The fourth block corresponding to a locomotive point of the to-be-interpolated block 52 as shown in FIG. 13B is extracted from the (m+n)-th frame 2 according to the second motion vector MV14 (step S215). In the process from steps S211 to S215 there are a number of candidates on a sub block pair of third and fourth sub blocks 15 and 16 like the first and second blocks. Therefore, a sub block pair is selected similarly to the block pair.

The second absolute difference value between opposite pixels of the third and fourth sub blocks 15 and 16 is derived (step S216).

It is determined whether the fourth sub block 16 extracted in step S215 belongs to the first region 21 or the second region 22 every pixel (S217).

As to the pixel belonging to the first region 21, the second absolute difference value obtained in step S216 is compared with the second threshold. The fifth sub block that the absolute difference value is less than the second threshold is extracted from at least the fourth sub block 16 (steps S218, S220). In step S220 of the present embodiment, the regions that the second absolute difference value is less than the second threshold are extracted from the third and fourth sub blocks 15 and 16, respectively. An average of the regions assumes a fifth sub block. The fifth sub block that the second absolute difference value is less than the second threshold may be extracted from only the fourth sub block 16.

Similarly, as to the pixel belonging to the second region, the second absolute difference value derived in step S219 is compared with the third threshold. The sixth sub block that the absolute difference value is less than the third threshold is extracted from at least the fourth sub block 16 (steps S219, S221). In step S221 of the present embodiment, the regions that the second absolute difference value is less than the third threshold are extracted from the third sub block 15 and the fourth sub block 16 respectively. An average of the regions assumes a sixth sub block. The sixth sub block that the second absolute difference value is less than the third threshold may be extracted from only the fourth sub block 16.

The pixel of the pixels of the fourth sub block 16 that belongs to neither of the fifth sub block nor the sixth sub block (pixel containing no image data in a to-be-interpolated block) is postprocessed as a to-be-postprocessed pixel to obtain image data of the to-be-postprocessed pixel (step S222). This postprocessing uses the same method as the first embodiment.

Last, the image data in the first, fifth and sixth sub blocks and the image data of each pixel derived by the postprocessing of step S222 are copied onto corresponding positions of the to-be-interpolated block 51, resulting in generating an interpolation image on (m+k)-th frame 3.

When the process from steps S200 to S223 is done for all to-be-interpolated blocks 51 derived by dividing the (m+k)-th frame 3, generation of interpolation image for the (m+k)-th frame 3 completes.

According to the present embodiment mentioned above, an interpolation image of a small interpolation error can be formed. Therefore, it is possible to display an image without block distortion and noise feeling. It can be realized in a moving image in particular to display a realistic image. Improving a blurring phenomenon of image can be expected in a hold type display device.

Fourth Embodiment

Figure 17:
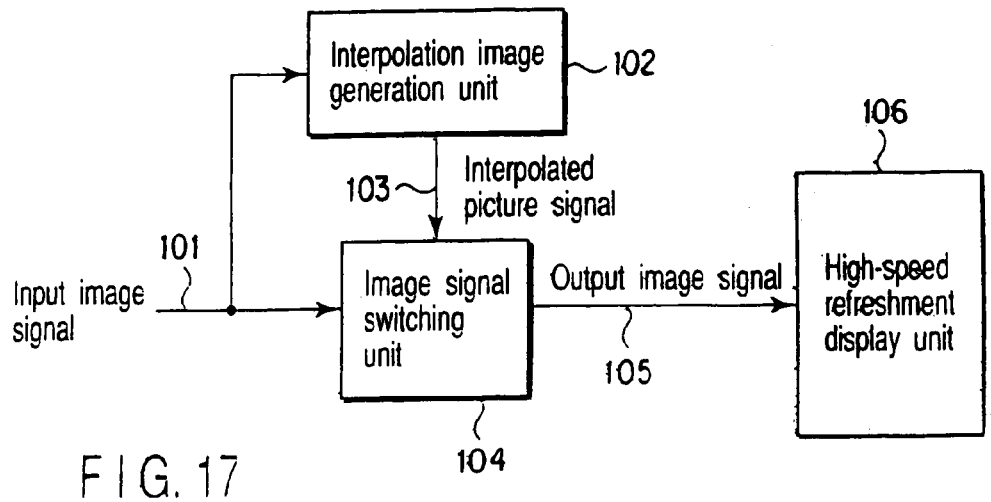
FIG. 17 is a block diagram showing configuration of a display system related to the fourth embodiment of the present invention.
Figure 16:
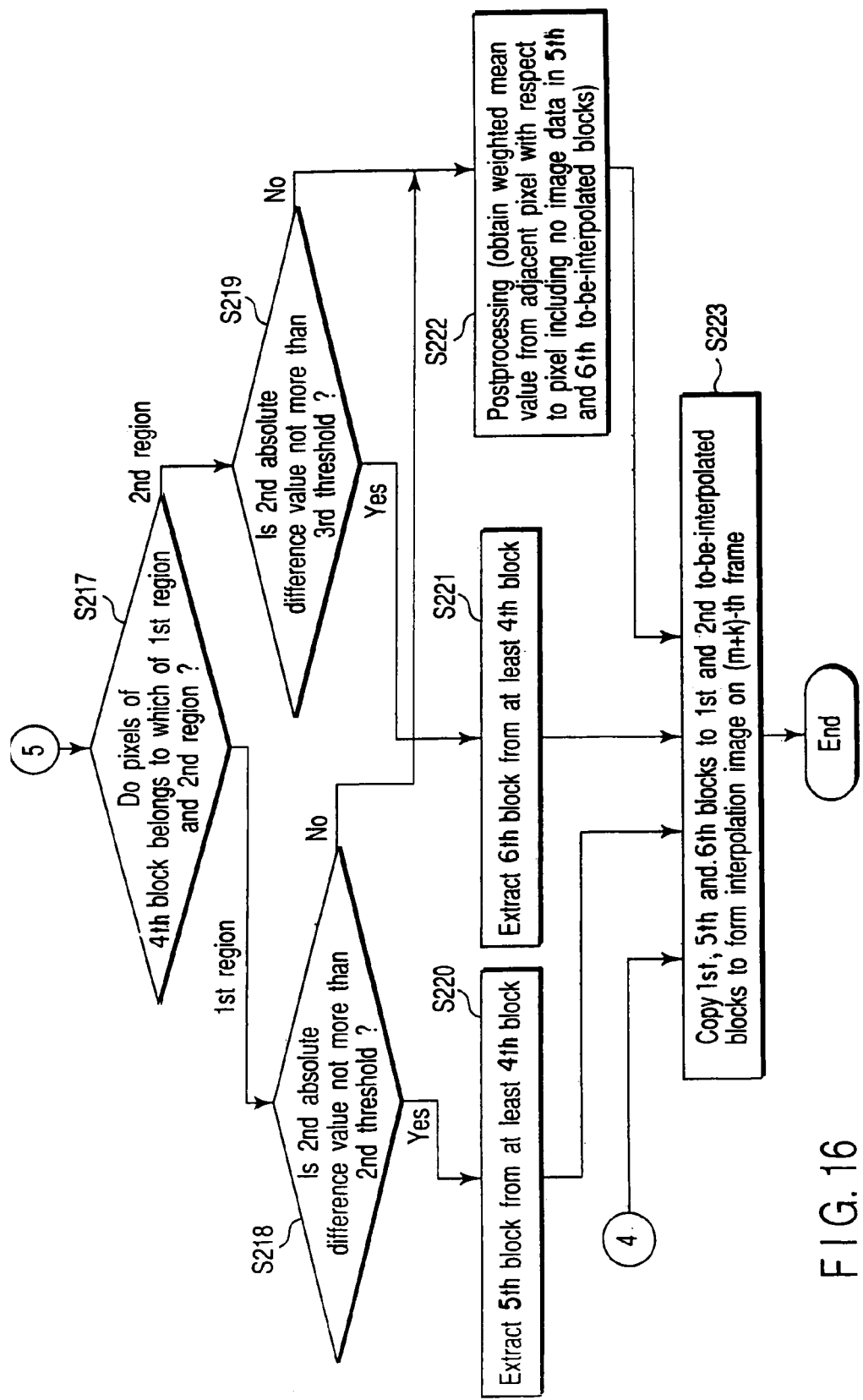
FIG. 16 is a flow chart showing an interpolation image generating procedure related to the embodiment.

An image display system using the interpolation image generating method explained in each of the above embodiments is explained as the fourth embodiment of the present invention. FIG. 17 shows a schematic configuration of the image display system related to the present embodiment. An input image signal 101 is input to an interpolation image generating unit 102 and an image switching unit 104. The interpolation image implementation unit 102 generates an interpolation image signal 103 according to the procedure described in either one of the first to third embodiments. The interpolation image signal 103 is output to the image switching unit 104. The image switching unit 104 outputs either the input image signal 1r an interpolation image signal 104.

The output image signal 105 from the image switching unit 104 is output to a high speed refresh display device 106 which is a hold type display device. The display unit 106 displays an image, for example, a moving image while changing a refresh rate according to a synchronizing signal included in the output image signal 105.

Fifth Embodiment

Figure 18:
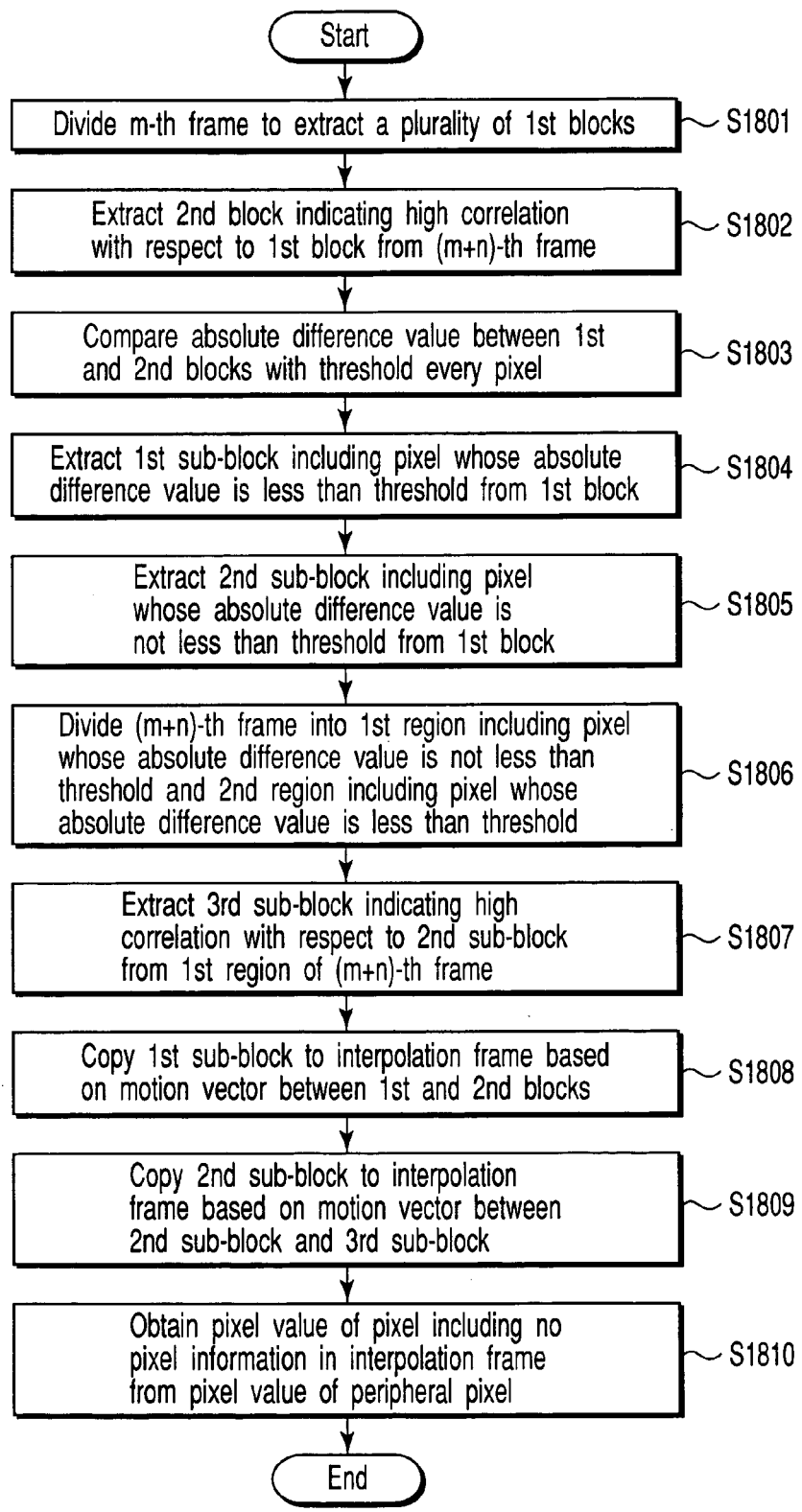
FIG. 18 is a flow chart of an interpolation image generating process of the fifth embodiment of the present invention.
Figure 20:
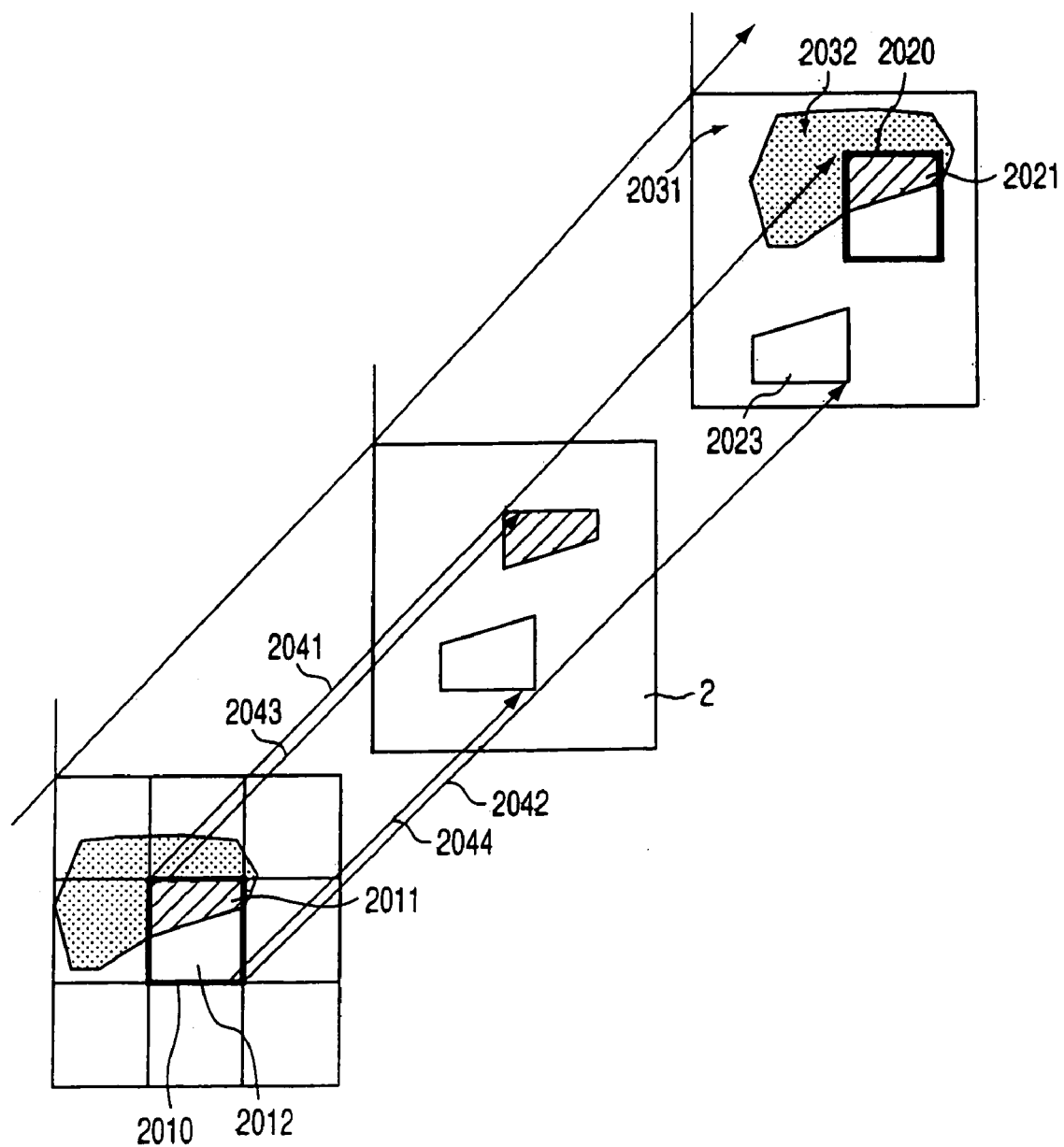
FIG. 20 shows schematically an interpolation image generating process of the fifth embodiment of the present invention.

There will be explained an interpolation image generating method of the fifth embodiment of the present invention hereinafter. The interpolation image generating method of the present embodiment is a method of generating an interpolation frame 2 between an m-th frame 2 and a (m+n)-th frame 2 (m is an integer, n is an integer other than 0). FIG. 18 is a flow chart of the interpolation image generating process of the present embodiment. FIG. 20 shows schematically the interpolation image generating process of the present embodiment.

An m-th frame 2 is divided to extract a plurality of blocks 2010 (step S1801). In the present embodiment, the m-th frame 2 is divided into a plurality of equal rectangular blocks.

A second block 2020 with a strong correlation with respect to the first block 2010 is extracted from the (m+n)-th frame 2(step S1802). The second block 2020 with a strong correlation with respect to the entire first block 2010 is extracted from the (m+n)-th frame 2.

In the present embodiment, the second block 2020 is extracted as follows. At first, an absolute difference value between the opposite pixels of the first block 2010 and the second block candidate is computed. Pixels that the absolute difference value is not more than a predetermined threshold are counted to obtain the pixel number p (p is an integer more than 0). At last, the second candidate that the pixel number p is maximum is extracted as the block 2020. Without being limited to the above method, for example, the second block candidate that the sum of the absolute difference values is minimum can be selected as the second block 2020.

The absolute difference value between the pixels of the first and second blocks 2010 and 2020 is compared with the threshold every pixel (step S1803). In the present embodiment, because the absolute difference value is compared with the threshold every pixel in step S1802, the result may be used without calculating again. The first sub block 2011 including pixels that the absolute difference value is less than the threshold is extracted from the first block 2010 (steps S1804, S1805). The second sub block 2012 including pixels that the absolute difference value is not less than the threshold is extracted from the first block 2010.

The (m+n)-th frame 2 is divided into a first region 2031 including pixels that the absolute difference value is not less than the threshold and a second region 2032 including pixels that it is less than threshold (step S1806).

A third sub block 2023 having a strong correlation with respect to the second sub block 2012 is extracted from the first region 2031 of the (m+n)-th frame 2 (step S1807). The extraction method is similar to step S1802.

The first sub block 2011 is copied onto an interpolation frame 2 based on the motion vector 2041 between the first and second blocks 2010 and 2020 (step S1808). The motion vector between the first and second blocks 2010 and 2020 is also a motion vector for the first sub block 2011. This motion vector is scaled according to a time interval between the m-th frame and (m+n)-th frame and a time interval between the m-th frame and the interpolation frame. The first sub block 2011 is copied onto the position on the interpolation frame that is indicated by the scaled motion vector 2043.

Instead of copying the first sub block 2011, the sub block 2021 on the second block 2020 that corresponds to the first sub block 2011 may be copied onto the interpolation frame. Alternatively, to the interpolation frame may be copied an image obtained by subjecting to a weighted average the sub block 2021 on the second block 2020 that corresponds to the first sub block and the first sub block 2011 according to a time interval with respect to the interpolation frame 2.

The second sub block 2012 is copied onto the interpolation frame 2 based on a motion vector 2042 between the second sub block 2012 and the third sub block 2023 (step S1809). The motion vector 2042 is scaled similarly to step S1808. To the position on the interpolation frame 2 that is indicated by the scaled motion vector 2044 is copied the second sub block 2012.

Instead of copying the second sub block 2012, the third sub block 2023 may be copied onto the interpolation frame 2. Alternatively, to the interpolation frame may be copied an image obtained by subjecting to weighted average the second sub block 2012 and the third sub block 2023 according to a time interval with respect to the interpolation frame. The pixel value of the pixel having no pixel information in the interpolation frame 2 is calculated using peripheral pixels (step S1810). For example, it is possible for obtaining the pixel value to use the method explained in step S116 of the first embodiment.

Sixth Embodiment

There will be explained an interpolation image generating method of the sixth embodiment of the present invention. The present embodiment differs from the fifth embodiment in a point to provide a method of searching for a block pair or a sub block pair. In the present embodiment, an interpolation frame is divided into a plurality of to-be-interpolated blocks as shown in FIGS. 12 and 13. The m-th frame and (m+n)-th frame are searched for a block pair or a sub block pair in geometry symmetry using this to-be-interpolated block as a reference. In other words, a block pair or a sub block pair that is in alignment with the to-be-interpolated block is searched for.

When an interpolation frame is expressed with a (m+k)-th frame, the simplest example is a case of n=1, k=0.5. In this case, a search for a block or a sub block that has a strong correlation between the m-th frame and (m+1)-th frame is done for a block pair or a sub block pair that is in the position of point symmetry with respect to the to-be-interpolated block used as a reference.

Searching a block pair or a sub block pair in geometry symmetry as thus described permits to suppress overlap of images or clearance between images occurring in copying image information onto the interpolation frame.

Figure 19:
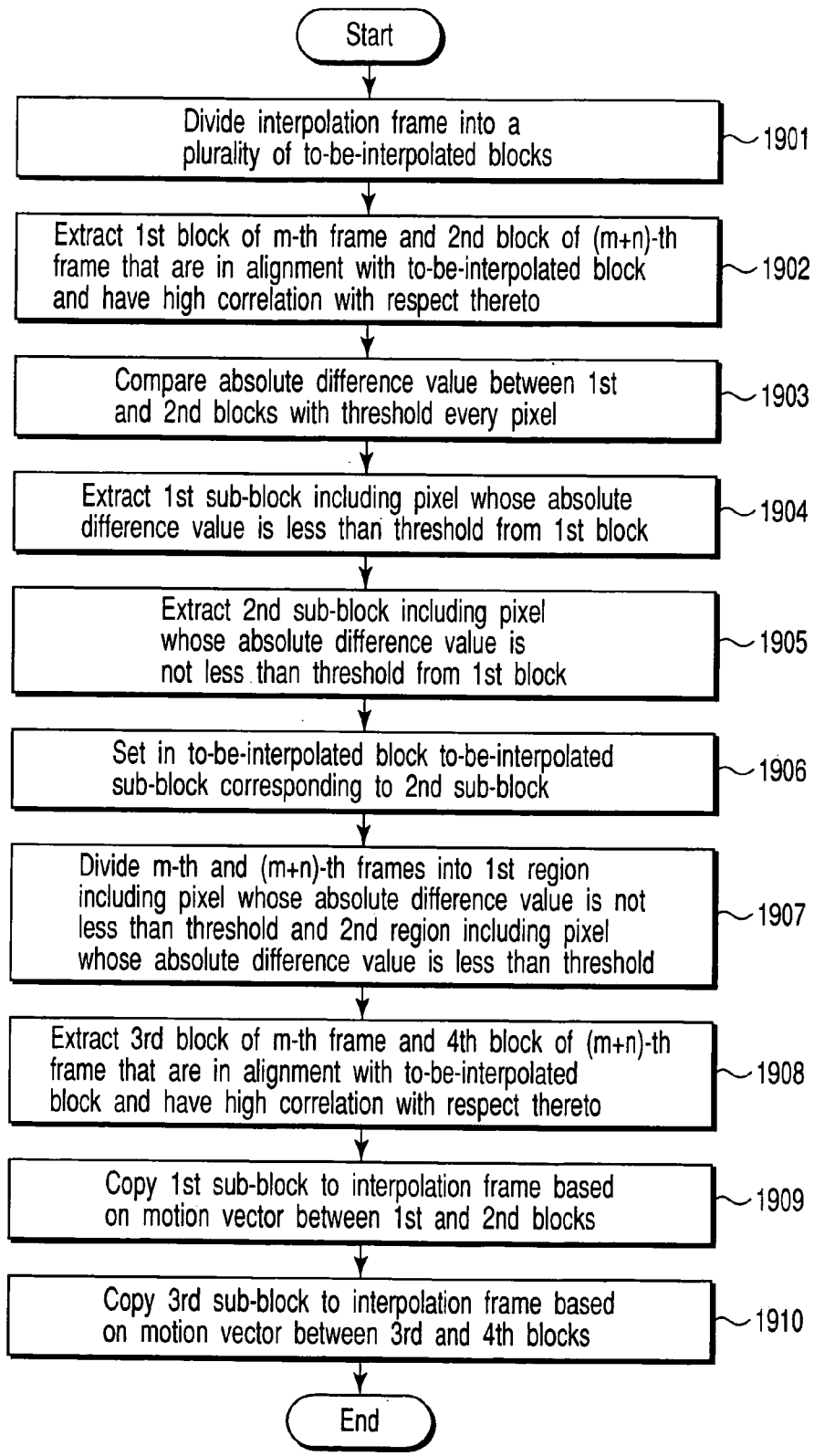
FIG. 19 is a flow chart of an interpolation image generating process of the sixth embodiment of the present invention.
Figure 21:
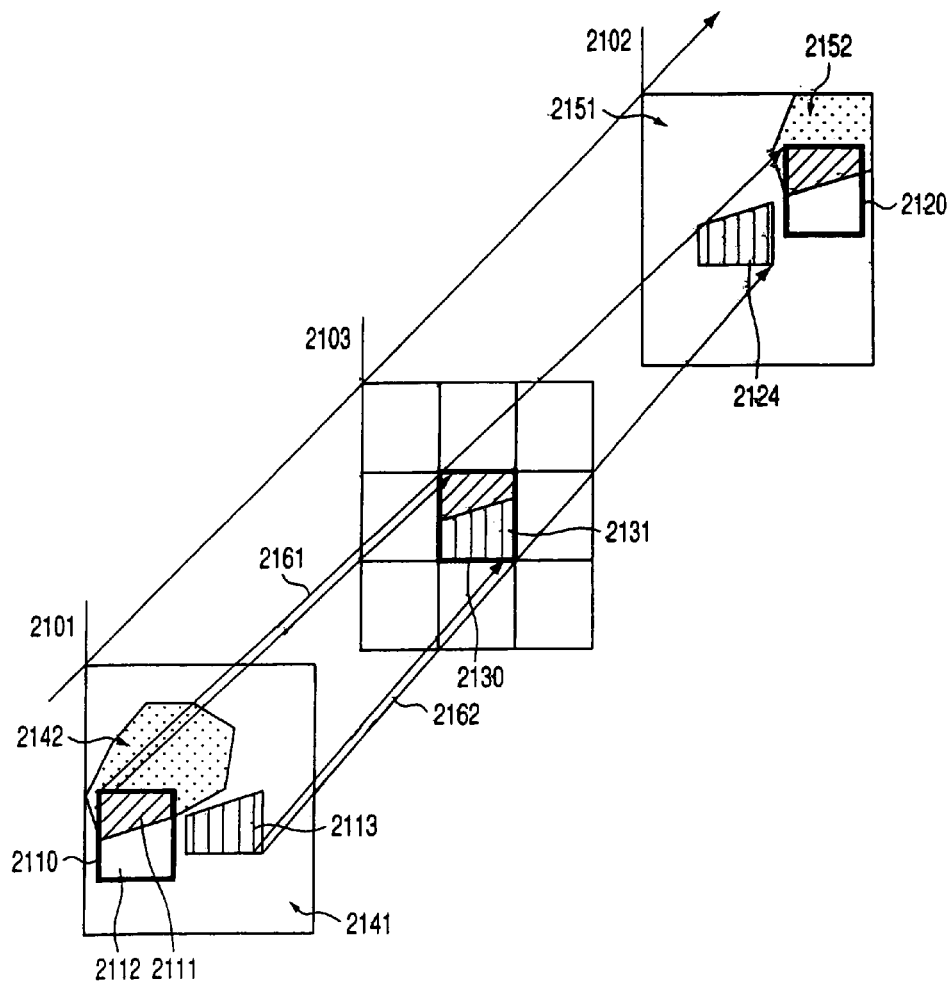
FIG. 21 shows schematically an interpolation image generating process of the sixth embodiment of the present invention.

FIG. 19 is a flow chart of an interpolation image generating process of the present embodiment. FIG. 21 shows schematically the interpolation image generating process of the present embodiment.

An interpolation frame 2103 is divided into a plurality of to-be-interpolated blocks 2130 (step S1901). The first block 2110 of the m-th frame 2101 and the second block 2120 of the (m+n)-th frame 2102 that are in alignment with the to-be-interpolated block 2130 and have a strong correlation are extracted (step S1902). By searching a block pair in geometry symmetry as described above, the first block 2110 is extracted from the m-th frame 2101 and the second block 2120 is extracted from the (m+n)-th frame 2102. The first and second blocks 2110 and 2120 are in alignment with the to-be-interpolated block 2130. The first and second blocks 2110 and 2120 have a strong correlation with respect to each other in a search range.

The absolute difference value between the pixels of the first and second blocks 2110 and 2120 is compared with the threshold for every pixel (step S1903).

The first sub block 2111 including the pixels that the absolute difference value is less than the threshold is extracted from the first block 2110 (step S1904).

The second sub block 2112 including the pixels that the absolute difference value is not less than the threshold is extracted from the first block 2110 (step S1905). The second sub block 2112 is a region with a weak correlation in the first block 2110.

A region corresponding to the second sub block 2112 in the to-be-interpolated block 2130 is provided as an to-be-interpolated sub block 2131 (step S1906). In other words, the region having a weak correlation is subjected to search again.

The m-th frame 2101 and (m+h)-th frame 2102 are divided into the first regions 2141 and 2151 including the pixels that the absolute difference value is not less than the threshold and the second regions 2142 and 2152 including the pixels that it is less than threshold (step S1907). A part extracted as a region having a strong correlation in the m-th frame 2101 and m+n frame 2102 is not used for search, resulting in improving interpolation accuracy. To do so, in this step, the m-th frame 2101 and (m+n)-th frame 2102 each are divided into a region to be used in search and a region which is not used in search.

The third sub block 2113 of the m-th frame 2101 and the fourth sub block 2124 of the (m+n)-th frame 2102 that are in alignment with the to-be-interpolated block 2130 and have a strong correlation are extracted from the first regions 2141 and 2151 (step S1908).

Similarly to step S1902, a geometry symmetry search for a sub block pair is done with respect to the to-be-interpolated sub block 2131. In other words, the third sub block 2113 is extracted from the first region 2141 of the m-th frame 2101, and the fourth sub block 2124 is extracted from the first region 2151 of the (m+n)-th frame 2102. When the search by this step is executed in a range around the first and second blocks 2110 and 2120, interpolation accuracy is improved in comparison with a case to search for without any restriction.

The first sub block 2111 is copied onto interpolation frame 2103 based on a motion vector 2161 between the first block 2110 and the second block 2120 (step S1909).

The third sub block 2113 is copied onto an interpolation frame based on a motion vector 2162 between the third sub block 2113 and the fourth sub block 2124 (step S1910).

In step S1910, the absolute difference value between the pixels of the third sub block 2113 and the fourth sub block 2124 is computed for every pixel. Only the pixels that the absolute difference value is not more than the threshold may be copied onto the interpolation frame and the other pixels may be interpolated by the pixel values of the peripheral pixels.

(Modification)

In the above step 1908, a sub block pair of the third and fourth sub blocks 2113 and 2124 are searched for. The sub block is a region that is smaller than a block. Besides, there is a condition detecting from the first regions 2141 and 2151. Therefor, a search condition becomes severe, and computed amount increases. For this reason, increase of the computed amount is restrained by searching in units of a block.

In concrete, the search is done using a to-be-interpolated block 2130 including a to-be-interpolated sub block 2131. At first, the third block candidate of the first frame 2101 and the fourth block candidate of the second frame 2102 that are in alignment with the to-be-interpolated block 2130 are searched for. As this occurs, when the similarity of the third block candidate and the fourth block candidate is computed, influence of the pixels included in the first regions 2141 and 2151 is increased than that of the pixels included in the second regions 2142 and 2152. For example, according to the method used in step S1802 of the fifth embodiment, the absolute difference value of the pixels included in the first regions 2141 and 2151 is compared with the first threshold. The absolute difference value of the pixels included in the second regions 2142 and 2152 is compared with the second threshold smaller than the first threshold.

The third block candidate and fourth block candidate that the correlation is maximum in a search range are selected as the third block and the fourth block. The third region corresponding to the to-be-interpolated sub block 2131 in the third block is the sub block 2113, and the fourth region corresponding to the to-be-interpolated sub block 2131 in the fourth block is the sub block 2124. According to the present invention, making small interpolative image of an interpolation error can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating an interpolation image, comprising:
 dividing a first image into a plurality of first blocks;
 searching a second image for a second block having a correlation with respect to one of the first blocks every first block;
 deriving a first motion vector between the first block and the second block;
 extracting a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;
 searching for a third sub block in a region on the second image, the third sub block having a stronger correlation with respect to the second sub block than to the first sub block, said correlation being stronger than a predetermined condition, the region corresponding to a region that the absolute difference value is less than the threshold;
 deriving a second motion vector between the second sub block and the third sub block;
 copying the first sub block and the second sub block onto a third image between the first image and the second image, using the first motion vector and the second motion vector, and
 outputting, as said interpolation image, the third image which is between the first image and the second image,
 wherein searching for the second block includes computing the absolute difference value between opposite pixels of each of a plurality of block candidates of the second image and the first block every pixel, counting pixels that the absolute difference value is less than the threshold to obtain the number of pixels, and selecting as the second block one of the block candidates in a search range that the number of pixels is maximum,
 wherein the absolute difference value is a first absolute difference value and the threshold is a first threshold, and searching for the third sub block includes
  computing a second absolute difference value of opposite pixels between each of a plurality of sub block candidates of the second image and the second sub block every pixel,
  counting pixels in the first region that the second absolute difference value is less than a second threshold to obtain the number of pixels,
  counting pixels in the second region on the second image that the first absolute difference value is less than the first threshold and the second absolute difference value is less than second threshold to obtain the second number of pixels, and
  selecting as the third sub block one of the second sub block candidates that sum of the number of pixels and the second number of pixels is maximum in a search range, and
 wherein the second threshold is smaller than the first threshold.

2. A method of generating an interpolation image, comprising:
 dividing a first image into a plurality of first blocks;
 searching a second image for a second block having a correlation with respect to one of the first blocks every first block;
 deriving a first motion vector between the first block and the second block;
 extracting a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;
 searching for a third sub block in a region on the second image, the third sub block having a stronger correlation with respect to the second sub block than to the first sub block, said correlation being stronger than a predetermined condition, the region corresponding to a region that the absolute difference value is less than the threshold;
 deriving a second motion vector between the second sub block and the third sub block;
 copying the first sub block and the second sub block onto a third image between the first image and the second image, using the first motion vector and the second motion vector, and
 outputting, as said interpolation image, the third image which is between the first image and the second image,
 wherein searching for the second block includes computing the absolute difference value between opposite pixels of each of a plurality of block candidates of the second image and the first block every pixel, counting pixels that the absolute difference value is less than the threshold to obtain the number of pixels, and selecting as the second block one of the block candidates in a search range that the number of pixels is maximum, wherein the absolute difference value is a first absolute difference value and the threshold is a first threshold, and searching for the third sub block includes computing a second absolute difference value of opposite pixels between each of a plurality of sub block candidates of the second image and the second sub block every pixel, counting pixels in the first region that the second absolute difference value is less than a second threshold to obtain the number of pixels, counting pixels in the second region on the second image that the first absolute difference value is less than the first threshold and the second absolute difference value is less than second threshold to obtain the second number of pixels, and selecting as the third sub block one of the second sub block candidates that sum of the number of pixels and the second number of pixels is maximum in a search range, and wherein the copying includes copying onto the third image the pixels of the first sub block, a first group of pixels in the first region that the second absolute difference value is less than the second threshold, and a second group of pixels in the second region on the second image that the first absolute difference value is less than the first threshold and the second absolute difference value is not less than the second threshold.

3. A method of generating an interpolation image, comprising:

dividing a first image into a plurality of first blocks;

searching a second image for a second block having a correlation with respect to one of the first blocks every first block;

deriving a first motion vector between the first block and the second block;

extracting a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;

searching for a third sub block in a region on the second image, the third sub block having a stronger correlation with respect to the second sub block than to the first sub block, said correlation being stronger than a predetermined condition, the region corresponding to a region that the absolute difference value is less than the threshold;

deriving a second motion vector between the second sub block and the third sub block;

copying the first sub block and the second sub block onto a third image between the first image and the second image, using the first motion vector and the second motion vector, and outputting, as said interpolation image, the third image which is between the first image and the second image, wherein searching for the second block includes computing the absolute difference value between opposite pixels of each of a plurality of block candidates of the second image and the first block every pixel, counting pixels that the absolute difference value is less than the threshold to obtain the number of pixels, and selecting as the second block one of the block candidates in a search range that the number of pixels is maximum, wherein the absolute difference value is a first absolute difference value and the threshold is a first threshold, and searching for the third sub block includes computing a second absolute difference value of opposite pixels between each of a plurality of sub block candidates of the second image and the second sub block every pixel, counting pixels in the first region that the second absolute difference value is less than a second threshold to obtain the number of pixels, counting pixels in the second region on the second image that the first absolute difference value is less than the first threshold and the second absolute difference value is less than second threshold to obtain the second number of pixels, and selecting as the third sub block one of the second sub block candidates that sum of the number of pixels and the second number of pixels is maximum in a search range, and wherein the copying includes copying onto the third image the pixels of the first sub block, a first group of pixels in the first region that the second absolute difference value is less than the second threshold, and a second group of pixels in the second region on the second image that the first absolute difference value is less than the first threshold and the second absolute difference value is not less than the second threshold, and wherein the copying includes obtaining a scale conversion factor by dividing a first time period between the third image and the second image by a second time period between the first image and the second image, obtaining a third motion vector by multiplying the first motion vector by the scale transfer coefficient, obtaining a fourth motion vector by multiplying the second motion vector by the scale transfer coefficient, copying pixels of the first sub block onto the third image based on the third motion vector, and copying, onto the third image, pixels belonging to the first group of pixels and the second group of pixels based on the fourth motion vector.

4. A method of generating an interpolation image, comprising:

dividing an interpolation image between a first image and a second image into a plurality of to-be-interpolated blocks;

searching for the first block of the first frame and the second block of the second frame, the first block and the second block being in alignment with the to-be-interpolated blocks and having a correlation to each other;

deriving a first motion vector between the first block and the second block;

extracting a first sub block and a second sub block from the first block, the first sub block including pixels that an absolute difference value between opposite pixels of the first block and the second block is less than a threshold, the second sub block including pixels that the absolute difference value is not less than the threshold;

extracting from each of the first image and the second image a region including pixels that the absolute difference value is not less than the threshold;

searching for a third sub block of the region of the first image and a fourth sub block of the region of the second image, the third sub block and the fourth sub block being in alignment with the to-be-interpolated blocks and having a stronger correlation with respect to each other than to either the first or second sub blocks, said correlation being stronger than a predetermined condition;

deriving a second motion vector between the third sub block and the fourth sub block;

copying the first sub block and the third sub block onto the interpolation image, using the first motion vector and the second motion vector, and outputting, as said interpolation image, the third image which is between the first image and the second image, wherein searching for the third sub block and the fourth sub block includes computing a second absolute difference value between opposite pixels of a third sub block candidate of the first image and a fourth sub block candidate of the second image every pixel, counting pixels of pixel pairs that the second absolute difference value is less than the second threshold, with both of the pixels less than the threshold and the pixels not less than the threshold existing in the region, to obtain the first number of pixels, counting pixels of pixel pairs that the second absolute difference value is less than the third threshold, with the pixels less than the threshold or the pixels not less than the threshold existing in the region, to obtain the second number of pixels, counting pixels that the second absolute difference value is less than the fourth threshold, with no pixel less than or not less than the threshold existing in the region, to obtain the third number of pixels, and selecting a sub block pair of the third sub block candidate and the fourth sub block candidate that a sum of the first number of pixels, the second number of pixels and the third number of pixels is maximum in a search range as the third sub block and the fourth sub block.

5. A method of generating an interpolation image, comprising:

dividing an interpolation image between a first image and a second image into a plurality of to-be-interpolated blocks;

searching for the first block of the first frame and the second block of the second frame, the first block and the second block being in alignment with the to-be-interpolated blocks and having a correlation to each other;

deriving a first motion vector between the first block and the second block;

extracting a first sub block and a second sub block from the first block, the first sub block including pixels that an absolute difference value between opposite pixels of the first block and the second block is less than a threshold, the second sub block including pixels that the absolute difference value is not less than the threshold;

extracting from each of the first image and the second image a region including pixels that the absolute difference value is not less than the threshold;

searching for a third sub block of the region of the first image and a fourth sub block of the region of the second image, the third sub block and the fourth sub block being in alignment with the to-be-interpolated blocks and having a stronger correlation with respect to each other than to either the first or second sub blocks, said correlation being stronger than a predetermined condition;

deriving a second motion vector between the third sub block and the fourth sub block;

copying the first sub block and the third sub block onto the interpolation image, using the first motion vector and the second motion vector, and outputting, as said interpolation image, the third image which is between the first image and the second image, wherein searching for the third sub block and the fourth sub block includes computing a second absolute difference value between opposite pixels of a third sub block candidate of the first image and a fourth sub block candidate of the second image every pixel, counting pixels of pixel pairs that the second absolute difference value is less than the second threshold, with both of the pixels less than the threshold and the pixels not less than the threshold existing in the region, to obtain the first number of pixels, counting pixels of pixel pairs that the second absolute difference value is less than the third threshold, with the pixels less than the threshold or the pixels not less than the threshold existing in the region, to obtain the second number of pixels, counting pixels that the second absolute difference value is less than the fourth threshold, with no pixel less than or not less than the threshold existing in the region, to obtain the third number of pixels, and selecting a sub block pair of the third sub block candidate and the fourth sub block candidate that a sum of the first number of pixels, the second number of pixels and the third number of pixels is maximum in a search range as the third sub block and the fourth sub block, and which includes selecting a region corresponding to the interpolation sub block in the third block as a third sub block, and selecting a region corresponding to the interpolation sub block in the fourth block as a fourth block.

6. An apparatus configured to generate an interpolation image, comprising:

a divider configured to divide a first image into a plurality of first blocks;

a first searcher configured to search a second image for a second block having a correlation with respect to one of the first blocks every first block;

a first deriving mechanism configured to derive a first motion vector between the first block and the second block;

an extractor configured to extract a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;

a second searcher configured to search for a third sub block in a region on the second image, the third sub block having a stronger correlation with respect to the second sub block than to the first sub block, said correlation being stronger than a predetermined condition, the region corresponding to a region that the absolute difference value is less than the threshold;

a second deriving mechanism configured to derive a second motion vector between the second sub block and the third sub block;

a copier configured to copy the first sub block and the second sub block onto a third image between the first image and the second image, using the first motion vector and the second motion vector, and to output, as said interpolation image, the third image which is between the first image and the second image, wherein the first searcher is configured to
compute the absolute difference value between opposite pixels of each of a plurality of block candidates of the second image and the first block every pixel,
count pixels that the absolute difference value is less than the threshold to obtain the number of pixels, and
select as the second block one of the block candidates in a search range that the number of pixels is maximum,
wherein the absolute difference value is a first absolute difference value and the threshold is a first threshold, and the second searcher is configured to
compute a second absolute difference value of opposite pixels between each of a plurality of sub block candidates of the second image and the second sub block every pixel,
count pixels in the first region that the second absolute difference value is less than a second threshold to obtain the number of pixels,
count pixels in the second region on the second image that the first absolute difference value is less than the first threshold and the second absolute difference value is less than second threshold to obtain the second number of pixels, and
select as the third sub block one of the second sub block candidates that sum of the number of pixels and the second number of pixels is maximum in a search range, and
wherein the second threshold is smaller than the first threshold.

7. An apparatus configured to generate an interpolation image, comprising:
a divider configured to divide a first image into a plurality of first blocks;
a first searcher configured to search a second image for a second block having a correlation with respect to one of the first blocks every first block;
a first deriving mechanism configured to derive a first motion vector between the first block and the second block;
an extractor configured to extract a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;
a second searcher configured to search for a third sub block in a region on the second image, the third sub block having a stronger correlation with respect to the second sub block than to the first sub block, said correlation being stronger than a predetermined condition, the region corresponding to a region that the absolute difference value is less than the threshold;
a second deriving mechanism configured to derive a second motion vector between the second sub block and the third sub block;
a copier configured to copy the first sub block and the second sub block onto a third image between the first image and the second image, using the first motion vector and the second motion vector, and to output, as said interpolation image, the third image which is between the first image and the second image,
wherein the first searcher is configured to
compute the absolute difference value between opposite pixels of each of a plurality of block candidates of the second image and the first block every pixel,
count pixels that the absolute difference value is less than the threshold to obtain the number of pixels, and
select as the second block one of the block candidates in a search range that the number of pixels is maximum,
wherein the absolute difference value is a first absolute difference value and the threshold is a first threshold, and the second searcher is configured to
compute a second absolute difference value of opposite pixels between each of a plurality of sub block candidates of the second image and the second sub block every pixel,
count pixels in the first region that the second absolute difference value is less than a second threshold to obtain the number of pixels,
count pixels in the second region on the second image that the first absolute difference value is less than the first threshold and the second absolute difference value is less than second threshold to obtain the second number of pixels, and
select as the third sub block one of the second sub block candidates that sum of the number of pixels and the second number of pixels is maximum in a search range, and
wherein the copier is configured to
copy onto the third image the pixels of the first sub block, a first group of pixels in the first region that the second absolute difference value is less than the second threshold, and a second group of pixels in the second region on the second image that the first absolute difference value is less than the first threshold and the second absolute difference value is not less than the second threshold.

8. An apparatus configured to generate an interpolation image, comprising:
a divider configured to divide a first image into a plurality of first blocks;
a first searcher configured to search a second image for a second block having a correlation with respect to one of the first blocks every first block;
a first deriving mechanism configured to derive a first motion vector between the first block and the second block;
an extractor configured to extract a first sub block and a second sub block from the first block, the first sub block including pixels that an absolute difference value is less than a threshold, the second sub block including pixels that the absolute difference value is not less than the threshold, the absolute difference value being an absolute difference value between opposite pixels of the first block and the second block;
a second searcher configured to search for a third sub block in a region on the second image, the third sub block having a stronger correlation with respect to the second sub block than to the first sub block, said correlation being stronger than a predetermined condition, the region corresponding to a region that the absolute difference value is less than the threshold;
a second deriving mechanism configured to derive a second motion vector between the second sub block and the third sub block;
a copier configured to copy the first sub block and the second sub block onto a third image between the first image and the second image, using the first motion vector and the second motion vector, and to output, as said interpolation image, the third image which is between the first image and the second image, wherein the first searcher is configured to
  compute the absolute difference value between opposite pixels of each of a plurality of block candidates of the second image and the first block every pixel,
  count pixels that the absolute difference value is less than the threshold to obtain the number of pixels, and
  select as the second block one of the block candidates in a search range that the number of pixels is maximum,
wherein the absolute difference value is a first absolute difference value and the threshold is a first threshold, and the second searcher is configured to
  compute a second absolute difference value of opposite pixels between each of a plurality of sub block candidates of the second image and the second sub block every pixel,
  count pixels in the first region that the second absolute difference value is less than a second threshold to obtain the number of pixels,
  count pixels in the second region on the second image that the first absolute difference value is less than the first threshold and the second absolute difference value is less than second threshold to obtain the second number of pixels,
  select as the third sub block one of the second sub block candidates that sum of the number of pixels and the second number of pixels is maximum in a search range, and
wherein the copier is configured to
  copy onto the third image the pixels of the first sub block, a first group of pixels in the first region that the second absolute difference value is less than the second threshold, and a second group of pixels in the second region on the second image that the first absolute difference value is less than the first threshold and the second absolute difference value is not less than the second threshold, and
wherein the copier is configured to
  obtain a scale conversion factor by dividing a first time period between the third image and the second image by a second time period between the first image and the second image,
  obtain a third motion vector by multiplying the first motion vector by the scale transfer coefficient,
  obtain a fourth motion vector by multiplying the second motion vector by the scale transfer coefficient,
  copy pixels of the first sub block onto the third image based on the third motion vector, and
  copy, onto the third image, pixels belonging to the first group of pixels and the second group of pixels based on the fourth motion vector.

9. An apparatus configured to generate an interpolation image, comprising:
  a divider configured to divide an interpolation image between a first image and a second image into a plurality of to-be-interpolated blocks;
  a first searcher configured to search for the first block of the first frame and the second block of the second frame, the first block and the second block being in alignment with the to-be-interpolated blocks and having a correlation to each other;
  a first deriving mechanism configured to derive a first motion vector between the first block and the second block;
  a first extractor configured to extract a first sub block and a second sub block from the first block, the first sub block including pixels that an absolute difference value between opposite pixels of the first block and the second block is less than a threshold, the second sub block including pixels that the absolute difference value is not less than the threshold;
  a second extractor configured to extract from each of the first image and the second image a region including pixels that the absolute difference value is not less than the threshold;
  a second searcher configured to search for a third sub block of the region of the first image and a fourth sub block of the region of the second image, the third sub block and the fourth sub block being in alignment with the to-be-interpolated blocks and having a stronger correlation with respect to each other than to either the first or second sub blocks, said correlation being stronger than a predetermined condition;
  a second deriving mechanism configured to derive a second motion vector between the third sub block and the fourth sub block;
  a copier configured to copy the first sub block and the third sub block onto the interpolation image, using the first motion vector and the second motion vector, and to output, as said interpolation image, the third image which is between the first image and the second image,
wherein the second searcher is configured to
  compute a second absolute difference value between opposite pixels of a third sub block candidate of the first image and a fourth sub block candidate of the second image every pixel,
  count pixels of pixel pairs that the second absolute difference value is less than the second threshold, with both of the pixels less than the threshold and the pixels not less than the threshold existing in the region, to obtain the first number of pixels,
  count pixels of pixel pairs that the second absolute difference value is less than the third threshold, with the pixels less than the threshold or the pixels not less than the threshold existing in the region, to obtain the second number of pixels,
  count pixels that the second absolute difference value is less than the fourth threshold, with no pixel less than or not less than the threshold existing in the region, to obtain the third number of pixels, and
  select a sub block pair of the third sub block candidate and the fourth sub block candidate that a sum of the first number of pixels, the second number of pixels and the third number of pixels is maximum in a search range as the third sub block and the fourth sub block.

10. An apparatus configured to generate an interpolation image, comprising:
  a divider configured to divide an interpolation image between a first image and a second image into a plurality of to-be-interpolated blocks;
  a first searcher configured to search for the first block of the first frame and the second block of the second frame, the first block and the second block being in alignment with the to-be-interpolated blocks and having a correlation to each other;
  a first deriving mechanism configured to derive a first motion vector between the first block and the second block;
  a first extractor configured to extract a first sub block and a second sub block from the first block, the first sub block including pixels that an absolute difference value between opposite pixels of the first block and the second block is less than a threshold, the second sub block including pixels that the absolute difference value is not less than the threshold;

a second extractor configured to extract from each of the first image and the second image a region including pixels that the absolute difference value is not less than the threshold;

a second searcher configured to search for a third sub block of the region of the first image and a fourth sub block of the region of the second image, the third sub block and the fourth sub block being in alignment with the to-be-interpolated blocks and having a stronger correlation with respect to each other than to either the first or second sub blocks, said correlation being stronger than a predetermined condition;

a second deriving mechanism configured to derive a second motion vector between the third sub block and the fourth sub block;

a copier configured to copy the first sub block and the third sub block onto the interpolation image, using the first motion vector and the second motion vector, and to output, as said interpolation image, the third image which is between the first image and the second image, wherein the second searcher is configured to compute a second absolute difference value between opposite pixels of a third sub block candidate of the first image and a fourth sub block candidate of the second image every pixel, count pixels of pixel pairs that the second absolute difference value is less than the second threshold, with both of the pixels less than the threshold and the pixels not less than the threshold existing in the region, to obtain the first number of pixels, count pixels of pixel pairs that the second absolute difference value is less than the third threshold, with the pixels less than the threshold or the pixels not less than the threshold existing in the region, to obtain the second number of pixels, count pixels that the second absolute difference value is less than the fourth threshold, with no pixel less than or not less than the threshold existing in the region, to obtain the third number of pixels, and select a sub block pair of the third sub block candidate and the fourth sub block candidate that a sum of the first number of pixels, the second number of pixels and the third number of pixels is maximum in a search range as the third sub block and the fourth sub block, and select a region corresponding to the interpolation sub block in the third block as a third sub block, and select a region corresponding to the interpolation sub block in the fourth block as a fourth block.

* * * * *